United States Patent
Yerli

(10) Patent No.: US 12,332,620 B2
(45) Date of Patent: Jun. 17, 2025

(54) SYSTEM AND METHOD OF ENERGY SUPPLY CHAIN MANAGEMENT AND OPTIMIZATION THROUGH AN ENERGY VIRTUAL TWIN

(71) Applicant: TMRW Group IP, Luxembourg (LU)

(72) Inventor: Cevat Yerli, Frankfurt am Main (DE)

(73) Assignee: TMRW Group IP, Luxembourg (LU)

( * ) Notice: Subject to any disclaimer, the term of this patent is extended or adjusted under 35 U.S.C. 154(b) by 440 days.

(21) Appl. No.: 17/730,695

(22) Filed: Apr. 27, 2022

(65) Prior Publication Data
US 2023/0350363 A1  Nov. 2, 2023

(51) Int. Cl.
G05B 19/042 (2006.01)
(52) U.S. Cl.
CPC .... *G05B 19/042* (2013.01); *G05B 2219/2639* (2013.01)
(58) Field of Classification Search
CPC .......... G05B 19/042; G05B 2219/2639; H02J 13/00002; H02J 2203/10; H02J 2203/20;
(Continued)

(56) References Cited

U.S. PATENT DOCUMENTS

| 8,706,650 B2 | 4/2014 | Ozog | |
| 11,881,713 B1 * | 1/2024 | Johnson | H02J 3/381 |

(Continued)

FOREIGN PATENT DOCUMENTS

| CN | 112531694 A * | 3/2021 | H02J 3/003 |
| EP | 3754462 A1 | 12/2020 | |

(Continued)

OTHER PUBLICATIONS

Erphan A. Bhuigan, Md., Zahid Hossain, S.M. Muyeen, Shahriar Rahman Fahim, Subrata K. Sarker, Sajal K. Das, "Towards next generation virtual power plant: Technology review and fireworks", Renewable and Sustainable Energy Reviews 150 (2021) 11135, E.A. Bhuigan et al., 18 pages.

*Primary Examiner* — Thomas C Lee
*Assistant Examiner* — Tyler Dean Hedrick
(74) *Attorney, Agent, or Firm* — BRYAN CAVE LEIGHTON PAISNER LLP

(57) ABSTRACT

An energy supply chain management and optimization system comprises an energy system comprising a plurality of inter-connected micro-grids connected to at least one macro-grid. The energy system connects to one or more cloud servers comprising at least one processor and memory storing computer code which, when executed by the at least one processor, implements a persistent virtual world system mapped according to the real world and comprising a plurality of virtual objects including at least one virtual replica of a corresponding real world element. The memory further stores a decentralized energy management system connected to the persistent virtual world system, comprising at least an energy control system configured to, through the virtualization of reality in the persistent virtual world system, digitally control energy flows based on data received from the energy system, and an energy market platform enabling energy aggregation and exchange between energy-related devices. Methods thereof are also disclosed.

26 Claims, 11 Drawing Sheets

(58) Field of Classification Search
CPC .......... H02J 3/06; H02J 3/381; G06Q 10/067;
G06Q 10/04; G06Q 10/0631; G06Q
50/06; G06T 19/006; Y04S 10/50; Y04S
30/10; Y04S 40/20; Y04S 50/10
See application file for complete search history.

(56) References Cited

U.S. PATENT DOCUMENTS

| | | |
|---|---|---|
| 2011/0231028 A1 | 9/2011 | Ozog |
| 2017/0005515 A1 | 1/2017 | Sanders et al. |
| 2017/0228479 A1 | 8/2017 | Meagher et al. |
| 2017/0237254 A1 | 8/2017 | Meagher et al. |
| 2018/0219374 A1 | 8/2018 | Pavlak et al. |
| 2018/0356867 A1 | 12/2018 | O'Hora |
| 2019/0372345 A1* | 12/2019 | Bain ................... H02J 3/381 |
| 2023/0107441 A1* | 4/2023 | Kimura ................ G06Q 50/06 |
| | | 705/317 |
| 2023/0222388 A1* | 7/2023 | Cella ................... G06N 3/08 |
| | | 706/12 |

FOREIGN PATENT DOCUMENTS

| | | |
|---|---|---|
| WO | 2018111368 A | 6/2018 |
| WO | 2018/231932 A1 | 12/2018 |

* cited by examiner

800

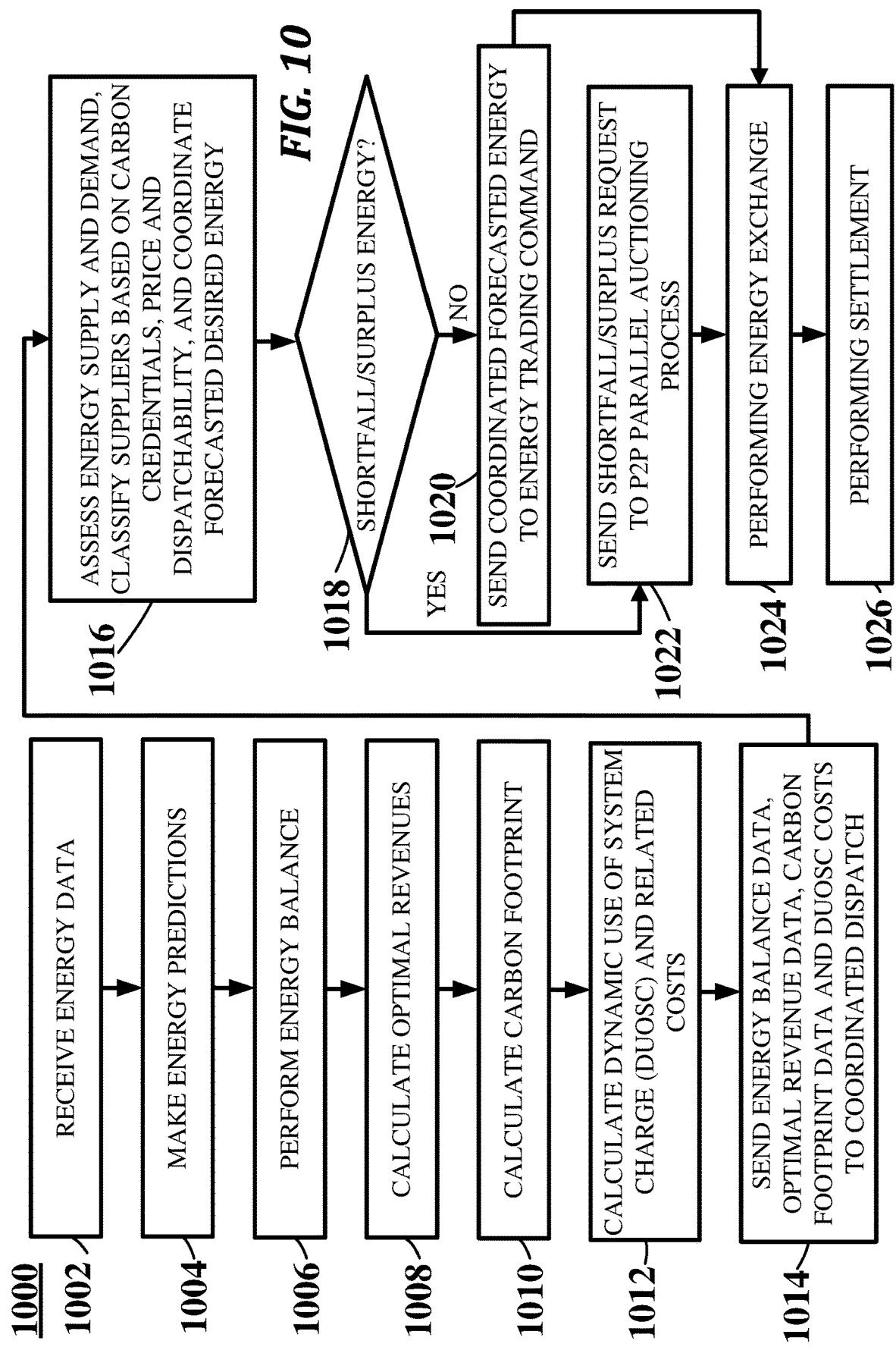

SYSTEM AND METHOD OF ENERGY SUPPLY CHAIN MANAGEMENT AND OPTIMIZATION THROUGH AN ENERGY VIRTUAL TWIN

BACKGROUND

Technology advancements have led to an increase in global demand of electricity with increasing future trends. Issues related to traditional grid energy systems, such as electricity shortages, power quality problems, rolling blackouts, electricity price and demand spikes, have inspired the conception of distributed energy resources (DERs), small-scale power generation sources located relatively close to the loads. DERs provide an alternative to the traditional electric power grid and may be powered by different types of energy, comprising renewable energy sources (e.g., wind, solar, hydraulic, biomass, geothermal energy, etc.). However, despite the development of DERs, static electricity management systems are currently not designed to adjust to the many daily changes to the electrical system that occur at a facility, leading to inefficient energy utilization and corresponding negative consequences.

The Energy Internet (EI) is an emerging concept, defining a new energy ecosystem that is promising to improve interconnectivity, openness and flexibility. EI is defined as a system of economic and control mechanisms that allows the dynamic balance of energy supply and demand across the entire electrical infrastructure using value as a key operational parameter. EI is based on a decentralized system of systems (SoS) with multi-vector DERs cooperating in real time through the use of smart grids. The trend is thus for prosumers to exchange energy in local peer-to-peer (P2P) networks known as micro-grids, but also with other micro-grids at regional, national or even international levels, removing the existing barriers between the wholesale and retail markets.

Challenges related to the EI involve advancing the technical architecture of the traditional grid from a centralized, command and control-oriented architecture to a decentralized and distributed P2P architecture. Another challenge is the management of the complexity in the relationships between prosumers, which drastically alters the current operational model of the traditional electrical grid and is already changing because of the adoption of clean energy sources, progressive deployment of storage systems, and the potential massive deployment of clean energy generation systems by prosumers and adoption of electric vehicles (EVs). Finally, the EI also involves economic model challenges, as the introduction of DERs will change completely the relationship between retail and customers, whereby customers may evolve from passive consumers of energy to prosumers, who produce, consume, store and trade energy. The number of transactions may thus explode while their frequency will increase, moving towards a fully decentralized real-time trading of energy of different types. The wholesale and retail markets will need to be integrated, because the energy regulators will demand to balance the energy trilemma (i.e., the difficulty of simultaneously meeting energy security of supply, low carbon emissions and low energy costs) in every deal.

What is therefore needed are novel systems and methods that can virtually aggregate DERs to satisfy the energy service requirements of users, while minimizing carbon emissions and energy generation and distribution costs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a multi-vector energy supply chain management and optimization system of the current disclosure comprises an energy system comprising a plurality of inter-connected micro-grids connected to at least one macro-grid. The energy system is communicatively coupled to one or more computing devices through an energy network. The one or more computing devices comprise at least one processor and memory storing computer code which, in response to execution by the at least one processor, causes the one or more computing devices to implement a persistent virtual world system and a decentralized energy management system. The persistent virtual world system is mapped according to a real world and comprises a plurality of virtual objects including at least one virtual replica of a corresponding real world element. Some of the virtual replicas comprise energy replicas of corresponding energy-related devices from the energy system. The decentralized energy management system comprises at least an energy control system configured to, through simulation in the persistent virtual world system, digitally integrate and control energy flows based on data received from the energy system, and an energy market platform enabling energy aggregation and exchange between energy-related devices using the persistent virtual world system.

In some embodiments, the energy control system performs one or more concurrent goal-oriented simulations in corresponding verses. The verses comprise at least an operation verse configured to define control strategies for preserving the quality and reliability of energy supply and control flows of energy in the energy network; a prediction verse configured to forecast energy demand and generation in a plurality of scenarios; and an analytics verse configured to perform augmented and prescriptive analytics. In further embodiments, each verse is sub-divided into different object-specific streams facilitating further goal-oriented simulations.

In further embodiments, the persistent virtual world system, via the concurrent goal-oriented simulations in corresponding verses, enables a seamless integration of artificial intelligence agents configured to automate energy management and trading processes.

In further embodiments, energy control strategies implemented by the energy control system via the concurrent goal-oriented simulations are based on at least one of optimizing energy generation and distribution as a factor of lowest energy cost, lowest carbon emissions and security of energy supply.

In some embodiments, the different verses are integrated in a unified view that provides a holistic and optimized management of the energy system.

In yet further embodiments, a plurality of energy market operators utilize individual instances of the energy market platform in order to aggregate and trade energy flows based on an energy data exchange from the energy control system. In yet further embodiments, the plurality of energy market operators communicate to one or more energy distribution system operators through instances of the energy control system in order to maintain distribution and transmission energy networks within operational limits through network reinforcement and load management. In yet further embodiments, the one or more energy market operators request shortfall energy to the one or more energy distribution system operators when energy demand is higher than energy supplied, or wherein the one or more energy market operators request, when energy supplied is higher than energy demanded, surplus energy to a peer-to-peer parallel auctioning system of the energy market platform to trade the surplus energy to external consumers. In some embodiments, the operation verse connects to metering, billing and bidding services of one or more energy market operators.

In some embodiments, the energy-related devices of the energy system include one or more of an energy-generating device, an energy storage device, an energy control device, an energy consuming device, and an energy distribution device. At least some of the energy-related devices are comprised within multi-vector distributed energy resources (DERs). In some embodiments, the DERs may comprise one or more energy-generating devices such as wind turbines, geothermal plants, hydroelectric plants, biomass plants, and electric vehicles (EVs), and/or other corresponding energy-related devices (e.g., energy storage devices, energy control devices, energy consuming devices, and energy distribution devices).

In some embodiments, the decentralized energy management system enables updating statuses of EV virtual replicas based on whether corresponding EVs are connected or disconnected from a charging station connected to a corresponding micro-grid. Further in these embodiments, connecting an EV to the corresponding micro-grid activates an unavailable status of the EV from a mobility network, and disconnecting the EV from the corresponding micro-grid activates an available status of the EV in the mobility network. In some embodiments, different instances of the decentralized energy management system share services, states and data using smart contracts to manage connections and exchange of information.

In some embodiments, interactions taking place via the market platform through the persistent virtual world system are gamified to incentivize users to optimize energy consumption patterns.

In some embodiments, the energy market platform supports an Energy-as-a-Service (EaaS) economy, providing an open market for trading of energy related data, services and simulations, where every prosumer may participate and add value to the whole energy market.

In some embodiments, the decentralized energy management system comprises or connects to an energy application store, enabling adding new content, applications and services to the decentralized energy management system.

In some embodiments, an energy supply chain management and optimization method are performed by one or more computing devices connected via an energy network to an energy system. The energy system comprises a plurality of inter-connected micro-grids connected to at least one macro-grid.

The method begins by providing a persistent virtual world system mapped according to the real world and comprising a plurality of virtual objects including at least one virtual replica of a corresponding real world element, wherein some of the virtual replicas comprise energy replicas of corresponding energy-related devices from the energy system. The method proceeds by providing a decentralized energy management system communicatively coupled to the persistent virtual world system and comprising at least an energy control system and an energy market platform. The method receives, by the persistent virtual world system, energy data from the energy system and energy transaction data from the energy market platform. The method assesses, controls and optimizes energy flows by the energy control system based on data received from the energy system and transaction data from the energy market platform, which is then used for coordinating functions between the energy control system and energy market platform, through simulation in the persistent virtual world system, in order to digitally integrate and control energy flows based on data received from the energy system. The method aggregates and exchanges energy between energy actors through energy-related devices via the energy market platform.

In some embodiments, after receiving, by the energy control system, the updated energy data from the persistent virtual world system, the method triggers the energy control system to concurrently perform one or more goal-oriented simulations in corresponding verses comprising at least an operation verse, a prediction verse and an analytics verse.

In various embodiments, the operation verse is configured to perform the steps of defining control strategies for preserving the quality and reliability of energy supply; and controlling the flows of energy in the energy network based on the control strategies. The prediction verse is configured to perform the step of forecasting energy demand and generation in a plurality of scenarios. The analytics verse is configured to perform the step of performing augmented and prescriptive analytics on received energy data.

In yet further embodiments, the method further comprises sub-dividing one or more of the verses into different object-specific streams facilitating further goal-oriented simulations. In some embodiments, a plurality of energy market operators utilize individual instances of the energy market platform in order to aggregate and trade energy flows based on energy exchange data from the energy control system. In yet further embodiments, the method further comprises sending, by the plurality of energy market operators to one or more distribution system operators through instances of the energy control system, distribution and transmission energy networks maintenance requests. The method then proceeds by implementing, by the one or more distribution system operators through said instances of the energy control system, network reinforcement and load management in order to maintain the distribution and transmission energy networks within operational limits. In some embodiments, the method further comprises connecting an EV to a corresponding micro-grid through a charging station. The method continues by activating an unavailable status of the EV from a mobility network while enabling the EV for energy trading. The method may continue by disconnecting the EV from the corresponding micro-grid through the charging station. Finally, the method may end by activating an available status of the EV in the mobility network while disabling the EV for physically trading energy.

In some embodiments the energy flows assessment, control and optimization method further comprises receiving energy data, from DERs connected to corresponding micro-grids, by the decentralized energy management system. The decentralized energy management system proceeds by making energy requirement predictions and with the prediction data thereby calculating optimal revenues. The method continues by DERs or decentralized energy management system calculating carbon footprint. The decentralized energy management system further calculates dynamic use of system charge and related costs. The method proceeds by sending data comprising energy balance, optimal revenues, carbon footprint and dynamic use of system charge and related costs to a coordinated dispatch function, which assesses energy supply and demand, classifies suppliers based on carbon credentials, price, and dispatchability, and coordinates forecasted desired energy. The method continues by the coordinated dispatch checking whether there is any shortfall or surplus energy. If there is no shortfall or surplus energy, the coordinated dispatch sends the coordinated forecasted energy to an energy trading command. However, if there is any shortfall or surplus energy, the coordinated dispatch sends a shortfall/surplus request to a peer-to-peer parallel auctioning process. The method continues by an energy exchange function performing desired energy exchanges. Finally, the method ends by performing settlement of energy flow costs to corresponding suppliers.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where:

FIG. 10 illustrates a block diagram providing further steps that may be performed during the energy flows assessment, control and optimization.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure describes a system and method for managing and optimizing an energy supply chain. Techniques of the current disclosure are based on the full digitization of the energy networks into a persistent virtual world system comprising a plurality of virtual replicas, wherein all or almost every element of the real world is replicated digitally. This simulated digital reality, or persistent virtual world system, connects to a decentralized energy management system that captures energy-related information and applies control strategies through an energy control system that enables the optimization of energy based on a comprehensive real-time monitoring of supply and demand at a micro (e.g., individual loads, buildings or residential areas) and macro- (e.g., district, town or city) level. The energy control system is characterized by enabling a multi-vector supply and control of energy to a plurality of loads, wherein the energy control system is configured to integrate and interoperate "child" local controllers comprised in decentralized energy resources (DERs). The decentralized energy management system further enables the trading of energy amongst different actors of the energy market through an energy market platform operating in coordination with the energy control system. The energy market platform supports an Energy-as-a-Service (EaaS) economy, providing an open market for trading of energy related data, services and simulations, where every prosumer may participate and add value to the whole energy market. Some of the real world objects are energy-related devices (e.g., energy generating, storing, controlling, distributing or consuming devices) comprising a corresponding energy replica stored, updated and executed in the persistent virtual world system. Thus, by virtualizing the energy supply chain, digitally recording, computing and simulating energy-related operations and interactions at a micro and macro level, systems and methods of the current disclosure enable the seamless interoperability between a plurality of actors in the energy market, from local to transnational level, through a unified virtual abstraction of the energy networks in the form of the persistent virtual world system.

Figure 1:
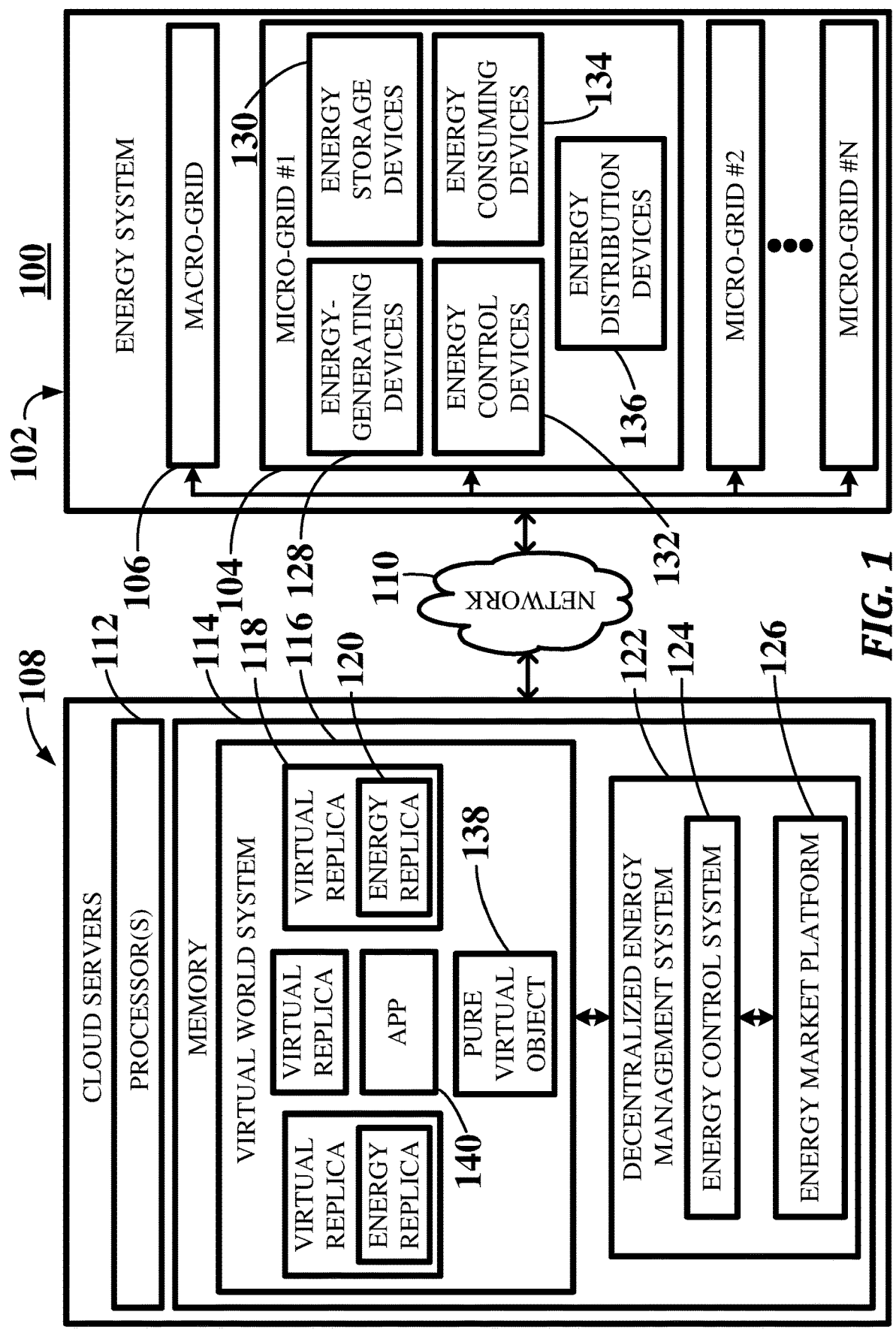
FIG. 1 illustrates a schematic representation of an energy supply chain management and optimization system, according to an embodiment.

FIG. 1 illustrates a schematic representation of an energy supply chain management and optimization system 100, according to an embodiment.

An energy supply chain management and optimization system 100 of the current disclosure comprises an energy system 102 including a plurality of inter-connected micro-grids 104 (e.g., micro-grids 1-N) connected to at least one macro-grid 106. The energy system 102 connects to one or more cloud servers 108 through a network 110. The one or more cloud servers 108 comprise at least one processor 112 and memory 114 storing computer code which, when executed by the at least one processor 112, implements a persistent virtual world system 116 mapped according to the real world and comprising a plurality of virtual objects including at least one virtual replica 118 of a corresponding real world element. Such a persistent virtual world system 116 is described in U.S. Pat. No. 11,202,036, titled "Merged Reality System and Method," and issued on 14 Dec. 2021, the entire disclosure of which is hereby incorporated by reference herein. As stated in such patent application, the spatial, physical and logical relationships of elements in the real world are replicated in the corresponding virtual replicas 118. The virtual replicas 118 may comprise logic, virtual data and models that provide self-computing capabilities and autonomous behavior. Data are the attributes of the virtual replicas and the models are the graphical, mathematical and logic representations of any aspect of the corresponding real-world element defined and governed through the comprised logic.

In some embodiments, some of the virtual replicas 118 comprise energy replicas 120 of corresponding energy-related devices from the energy system 102. The memory 114 further stores a decentralized energy management system 122 connected to the persistent virtual world system 116, comprising at least an energy control system 124 configured to digitally control energy flows based on data received from the energy system 102, and an energy market platform 126 enabling energy aggregation and energy and service exchange between energy-related devices.

In some embodiments of the current disclosure, the system 100 may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. In this way, distributed computing resources, including physical servers and networking equipment, enable a shared storage and computing that may be dynamically allocated depending on factors such as the location of the users of the services, their context, their requested quality of services or their computational demand. In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in non-volatile storage location in the server. In this way, virtual replicas, purely virtual objects and applications may interact and collaborate with each other when being configured for accomplishing specific goals even if users are not connected to the server.

In some embodiments, the energy-related devices of the energy system 102 comprise one or more of a plurality of energy-generating devices 128, energy storage devices 130, energy control devices 132, energy consuming devices 134, and energy distribution devices 136. Each of the energy-related devices is interpreted by the persistent virtual world system 116 as a logical resource whose information is stored in the corresponding energy replica 120. In further embodiments, at least some of the energy-related devices may connect to the persistent virtual world system 116 through a physical interface gateway that may be part of the network 110.

In some aspects of the current disclosure, at least some of the energy-related devices are comprised within DERs that connect to one or more micro-grids 104. DERs are small scale, decentralized connected energy resources with equipment and technology to generate, store, and distribute generated energy, typically located close to the load they serve. For example, the DERs may comprise one or more energy-generating devices 128 such as wind turbines, geothermal plants, hydroelectric plants, biomass plants, and electric vehicles (EVs) along with the corresponding energy storage devices 130, energy control devices 132, energy consuming devices 134, and energy distribution devices 136.

The energy storage devices 130 can be used, in some embodiments, to support renewable energy generation, provide power quality services, peak load levelling or an uninterruptible power supply. Different types of energy storage devices 130 may be used, such as pumped hydrostorage, compressed air energy storage (CAES), liquid air energy storage (LAES), flywheel technology, and batteries. Batteries may be, for example, lithium-ion batteries, lead acid batteries, sodium sulphur batteries, nickel cadmium batteries, vanadium redox flow batteries, zinc bromine flow batteries, polysulphide bromine flow batteries, and residential battery systems.

Local energy control devices 132 manage each of the DERs and corresponding energy-related devices in a decentralized manner. In various embodiments, local energy control devices 132 are configured for a specific DER or for a plurality of DERs. The local energy control devices 132 may implement supervisory control and data acquisition (SCADA) functions for the specific one or more DERs. In some embodiments, energy control devices 132 are configured to communicate with neighboring energy control devices 132 of other DERs in the same or other areas in order to receive from or provide energy to the other DERs. In other embodiments, the local energy control devices 132 receive control signals from the energy control system 124 so that energy controlling operations from the local control devices 132 follow specific energy control strategies based on parameters defined by the energy control system 124. Control signals from the energy control system 124 are sent through the network 110 to the respective local energy control devices 132 using existing communications networks via a secure access gateway. The control signals provide functionality such as demand side response and fast frequency response. For example, control strategies ruling said control operations may be based on optimizing energy generation and distribution as a factor of lowest energy cost, lowest carbon emissions and security of supply. Thus, controlling strategies of the current disclosure enable a combination of a centralized control through the energy control system 124 and a decentralized control through the plurality of local energy control devices 132. The decentralized model provides greater control of the assets in manageable portions of the network 110 and provides a higher redundancy than the centralized control system. Data processing also becomes more manageable with local area energy control devices 132 with an added advantage of reduction in data processing power compared to the centralized control system.

In some embodiments, energy control utilizes monitoring of each of the energy-related devices in the DERs, which may be performed through a plurality of smart meters sending monitoring signals to the energy control system 124 and to local energy control devices 132. Smart meters are electronic devices that record consumption of electric energy and communicate the information to the electricity supplier for monitoring and billing. Smart meters enable two-way communications between the meter and a central system or provider through wired or wireless networks 110. Monitoring may not only be used at each individual energy market actor, but also at a local geographical level. In embodiments of the current disclosure, the persistent virtual world system 116, by providing a visual representation of the energy network identifying the constraints and real-time statuses of one or more energy network actors, may enable the local area controllers to make informed decisions in conjunction with artificial intelligence (AI) algorithms that may assist in the management of the energy network. This may provide the energy control system 124 with the ability to control local energy control devices 132, as well as enable energy transfer between local energy control devices 132.

Energy control devices 132 provide inputs to the energy control system 124 that can be used to govern how the energy control system 124 distributes energy across each of the energy consuming devices 134 comprised in the corresponding micro-grid 104. Energy control devices 132 may comprise existing devices such as lighting controllers, heating, ventilation, and air conditioning (HVAC) controllers (e.g., thermostats), and the like. Energy control devices 132 may be located in corresponding workstations or locations throughout buildings. For example, touchscreen panels may be provided in each office or room to provide local lighting or HVAC control. Energy consuming devices 134 are devices that receive commands from the energy control devices 132 and accordingly consume energy. Examples of energy consuming devices 134 are lighting systems, HVAC systems, computing devices, home appliances, boilers, electric vehicles (EVs) and the like. Energy distribution devices 136 may be devices used to distribute energy across a plurality of energy consuming devices 134 within an energy network, and may comprise, for example, energy routers, energy hubs, wireless energy transfers devices, direct current networks, plug and play devices and techniques, and the like.

In some embodiments, the energy supply chain management and optimization system 100 may connect through a network 110 such as 3G, 4G, or 5G network; through wireless local area networking (Wi-Fi), or through wired communication systems. In other embodiments, global navigation satellite systems (GNSS), which refers collectively to multiple satellite-based navigation systems like GPS, BDS, Glonass, QZSS, Galileo, and IRNSS, may be used for enabling positioning of devices in order to provide an accurate position of the corresponding virtual replicas.

In some embodiments, each energy replica 120 and associated energy-related device may comprise a unique digital ID code that may be used to recognize and authenticate the associated energy-related device along with all the connections and interactions related to that specific energy-related device. In some examples, the unique ID code may be associated to information such as serial numbers, product codes, licensing information, owner information, physical attributes (e.g., shape, size, color, etc.), operating parameters, control parameters, etc., of the energy-related device.

In some embodiments, the persistent virtual world system 116 includes the real-world coordinates, such as position, orientation, scale and dimension of real-world objects, the physical properties, and the 3D structure of each of the real objects in the form of virtual replicas 118. The persistent virtual world system 116 refers to a virtual version of the real world, wherein all or most objects of the real world are represented as corresponding virtual replicas 118. In further embodiments, the persistent virtual world system 116 further comprises purely virtual objects 138 and applications 140.

The virtual replicas 118 of the current disclosure refer to a virtual version, or virtual twin, of a real-world element, or real twin, which may either be mapped or modeled through computer assisted drawing (CAD) or computer-assisted engineering (CAE) methods, input by computer models of the real objects (e.g., building information models-BIMs) or other suitable methods, and which may mirror not just the appearance but also the behavior of the real-world counterpart. The real-world objects may additionally include sensors (e.g., Internet of Things (IoT) sensors, smart meters, etc.) that can provide the virtual replicas 118 with multi-source sensory data for enriching and synchronizing the virtual replicas 118 with their respective real counterpart, enabling real-time or almost real-time updates of the virtual replicas 118. The multi-source sensory data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others. In particular, for energy-related devices, the multi-source sensory data of the corresponding virtual replicas 118 comprises energy data that is shared to the energy replicas 120.

In the current disclosure, the term "enriching" is used to describe the act of providing further properties to a virtual replica based on multi-source sensory data. For example, enriching the virtual replicas may refer to providing real-world data captured from sensory mechanisms.

In some embodiments, a plurality of connected virtual replicas 118 form a virtual replica network, which enable the establishment of peer-to-peer (P2P) connections either through direct physical communications or through indirect virtual replica-based connections. These relationships can trigger events that may create new interactions in the persistent virtual world system 116. For example, an event, such as the energy control system 124 determining that one or more micro-grids 104 have insufficient energy generation for a given moment, may be translated into a state update for the corresponding energy replica 120. Said update may prompt the energy control system 124 to use this information to calculate the shortfall energy that may be provided by other micro-grids 104 via the energy market platform 126. A negotiation process may take place between prosumers through the energy market platform 126 to obtain the shortfall energy. In some embodiments, said calculations and trading may be performed by artificial intelligence (AI) agents seamlessly integrated in the persistent virtual world system. Thus, he virtual replica networks enable machine to machine, human to machine, machine to human, and human to human interactions that may be used in the energy management and trading processes.

In some embodiments, the virtual replicas 118 comprise suitable models including one or more of a 3D model, dynamic model, geometric model, and machine learning model. The models and data may be input via a plurality of external platforms or engine services connected to the persistent virtual world system 116 enabling the development of each of the virtual replicas. The plurality of external platforms may include, for example, an Internet of Things (IoT) platform, a machine learning (ML) platform, a big data platform or a simulation platform. External platforms may connect to the persistent virtual world system 116 through application programming interfaces (APIs) and software development kits (SDKs), in order to provide and manipulate models and data of the virtual replicas 118. The engines services included in the persistent virtual world system may include artificial intelligence, simulation, 3D and haptic features, amongst others. The persistent virtual world system may also connect to a spatial data streaming platform configured to receive and manage spatial data from the real-world elements and also from their virtual replicas. The system may further comprise digital reality interfaces, such as virtual reality, augmented reality, and merged reality interfaces to interact with the merged reality or virtual reality, enabling user interactions with the virtual replicas 118 and corresponding energy replicas 120 for energy management and optimization.

Figure 2:
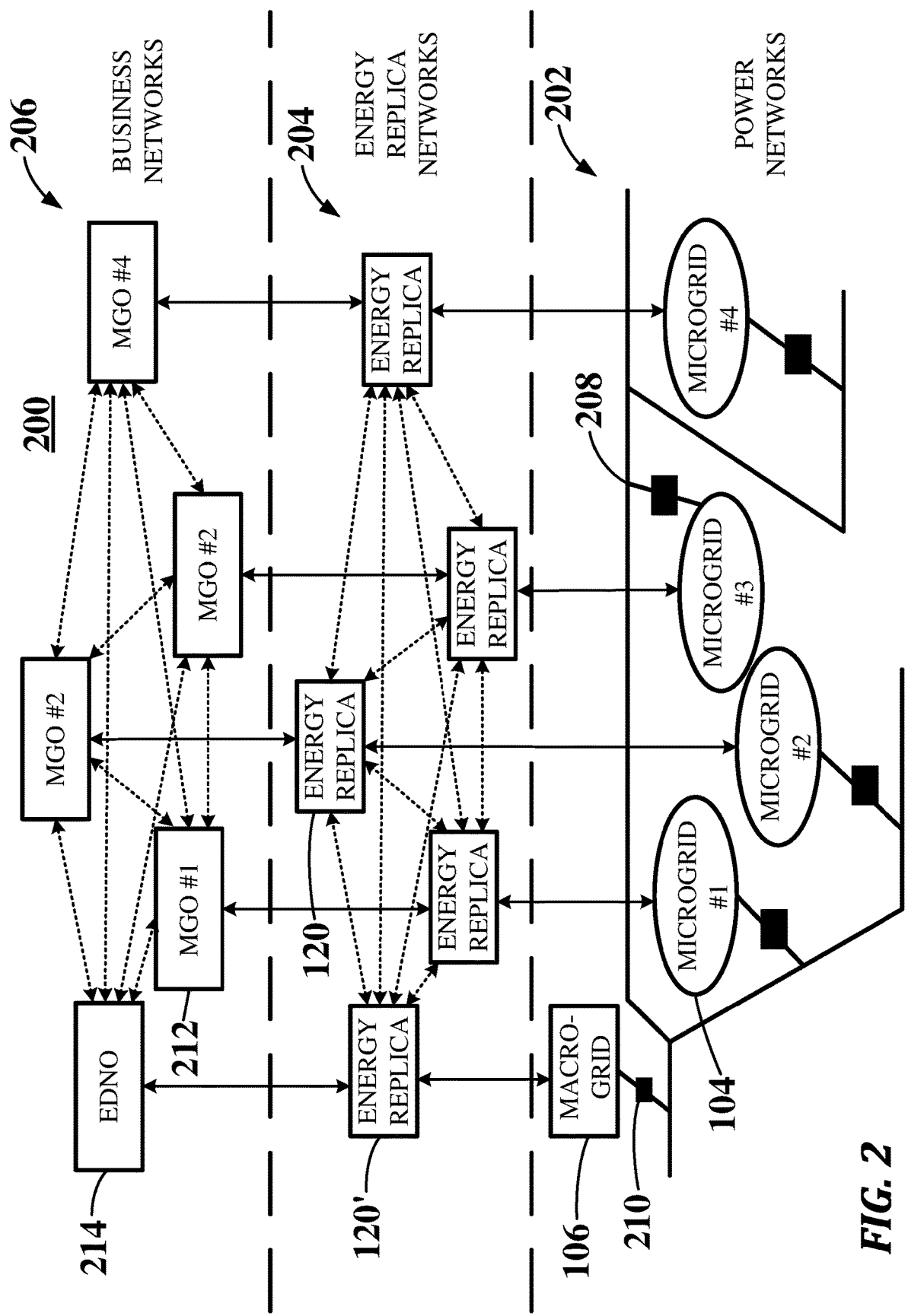
FIG. 2 illustrates a schematic representation of an energy trading distribution network for use in a peer-to-peer energy trading, according to an embodiment.

FIG. 2 illustrates a schematic representation of an energy trading distribution network 200 for use in a peer-to-peer energy trading, according to an embodiment. Some elements of FIG. 2 may refer to similar or the same elements of FIG. 1 and thus may use the same reference numbers.

The energy trading distribution network 200 of FIG. 2 comprises a three-layer architecture that may enable P2P energy trading through an energy market platform (e.g., energy market platform 126 of FIG. 1) coordinated with an energy control system (e.g., energy control system 124 of FIG. 1). The three layers comprise at least one power network 202, an energy replica network 204, and a business network 206. In FIG. 2, solid vertical arrows represent dataflow between layers, while the dotted arrows represent dataflow within the same layers.

The power network 202 comprises a plurality of micro-grids 104 connecting to a macro-grid 106. The power network 202 is part of an energy system, such as the energy system 102 of FIG. 1, and thus comprises a plurality of energy-related devices. The micro-grids 104 are situated in different geographical locations where DERs are connected to distributed connection points 208. The micro-grids 104 further provide energy information to smart meters 210, which dynamically record consumption of electric energy and communicate the information to the energy replica network 204. The internal topology of each micro-grid 104 may vary and may operate individually or in conjunction with each other. For example, each micro-grid 104 may supply its corresponding power demand not only by dispatching DERs but also by importing power from neighboring micro-grids 104 or the macro-grid 106, or combinations thereof.

The energy replica network 204 comprises energy replicas 120 of the different energy-related devices within the plurality of micro-grids 104 and/or macro-grids 106. Each or most of the different elements of the energy replica networks 204 are connected, as represented by the dotted arrows. The energy replica network 204 may be comprised within the persistent virtual world system 116 connected to the decentralized energy management system 122 of FIG. 1. In general, the energy replicas 120 of the energy replica network 204 obtain energy consumption data from the plurality of smart meters 210 within the power networks 202 and accordingly update each of the corresponding energy replicas 120. The energy replica network 204 may comprise communication devices, applications, protocols and information flow transmitting data that may be processed through the decentralized energy management system 122 of the one or more cloud servers 108 in order to manage and optimize the energy flows.

The business network 206 comprises a plurality of operators, such as micro-grid operators (MGOs) 212, energy distribution network operators (EDNOs) 214, or other types of operators to collaborate between them through the corresponding energy replicas 120 via an energy market platform (e.g., energy market platform 126 of FIG. 1), enabling multidirectional exchange of energy, services and information. Each of the different elements of the business networks 206 are interconnected, as represented by the dotted arrows. In the example embodiment of FIG. 2, the macro-grid 106 is represented and managed through the corresponding energy replica 120' by the EDNO 214, while each of the other micro-grids 104 are managed by corresponding MGOs 212 through their corresponding energy replicas 120. In some embodiments, the business network 206 connects each of the different actors through a blockchain or distributed ledger for developing various kinds of business models that determine the energy trading strategy with other operators.

Figure 3:
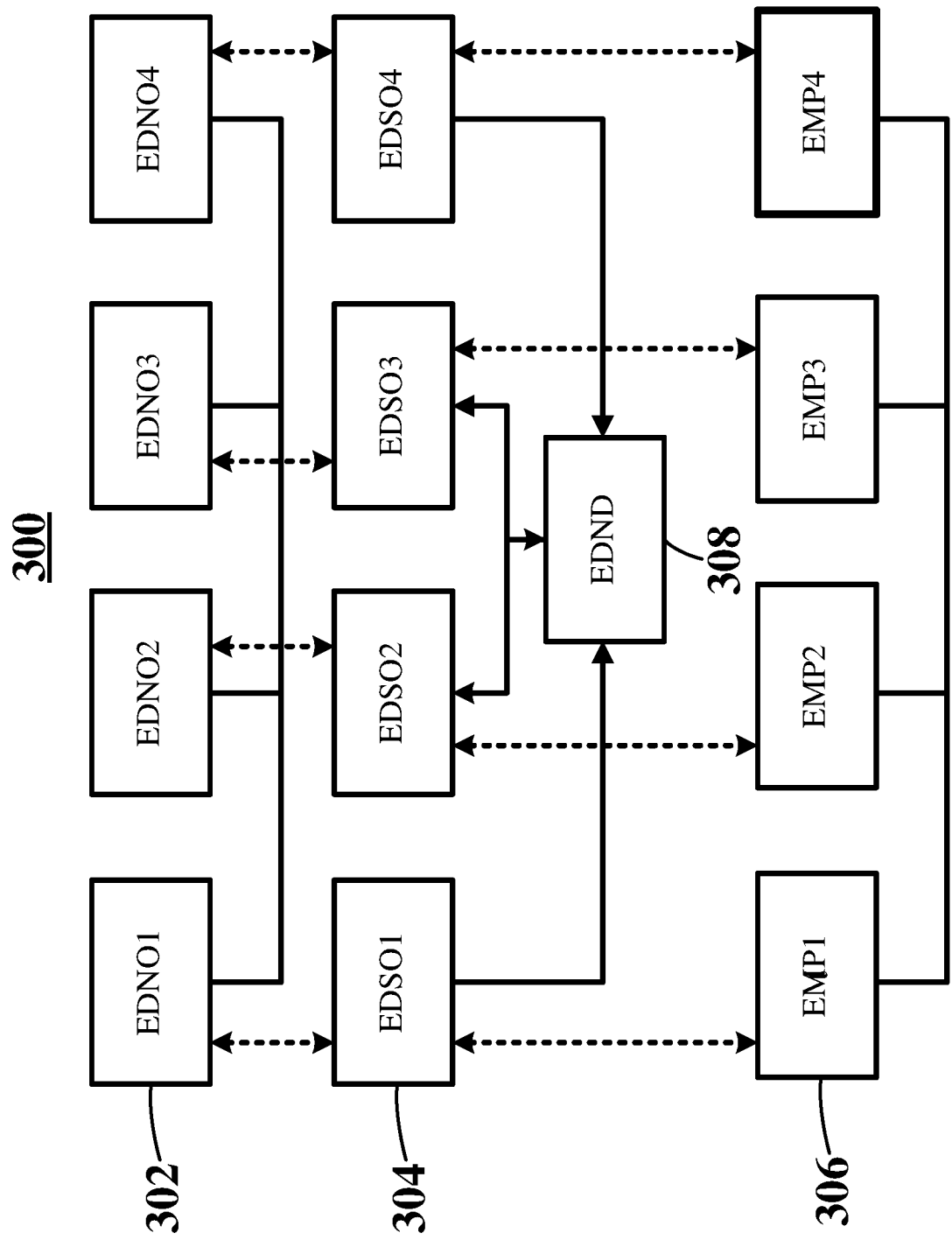
FIG. 3 illustrates a schematic representation of an energy trading distribution network employing at least one energy market platform of the current disclosure and a plurality of energy distribution networks and operators, according to an embodiment.

FIG. 3 illustrates a schematic representation of another embodiment of an energy trading distribution network 300 employing a plurality of energy market platforms (EMPs) and a plurality of energy distribution networks and corresponding operators, according to an embodiment. Some elements of FIG. 3 may refer to similar or the same elements of FIG. 1 to FIG. 2 and thus may use the same reference numbers.

To coordinate the mixture of generation and energy demands efficiently with multiple DERs connected to a plurality of micro-grids of energy systems of the current disclosure (e.g., micro-grids 102 and energy system 104 of FIG. 1), the energy trading distribution network 300 comprises EDNOs 302 that may be connected to a corresponding energy distribution system operator (EDSO) 304 and to an energy market platform (EMP) 306. Each EDNO 302, EDSO 304 and EMP 306 may be assigned to one or more specific geographic areas. Each EDNO 302 may further connect to other area-specific EDNOs 302 in order to improve efficiency, safety, reliability and resilience of energy services by providing a greater pool of energy resources when desired (e.g., at energy peak moments).

EDNOs 302 are considered to be market operators in charge of aggregating DERs and managing corresponding micro-grids within one or more pre-defined geographic areas and providing related energy to corresponding consumers or prosumers through transactions taking place via the corresponding EMPs 306. EDNOs 302 communicate with EDSOs 304, which are system regulators capable of maintaining distribution and transmission energy networks within operational limits (e.g., frequency, voltage, gas pressure, etc.) through network reinforcement and load management. EDSOs 304 may be further configured to provide shortfall energy desired by EDNOs 302 and receive surplus energy after peer-to-peer auctioning of energy takes place through the EMPs 306, as will be further described with respect to FIG. 5. The EDSOs 304 may be mutually connected via an energy distribution network database (EDND) 308, which may be stored in a cloud server, such as cloud server 108 of FIG. 1, and which may keep track of all energy transactions performed in the EMPs 306.

In some embodiments, each EDNO 302 is able to work in islanded mode during the time when no energy importing or exporting operations are taking place from other EDNOs 302. For example, EDNO1 is able to supply assigned loads at a moment when no energy imports or exports are taking place from any of EDNOs 2-4, in which case EDNO1 may be configured in islanded mode. Otherwise, when energy imports or exports are taking place from other EDNOs 302, EDNOs 302 are able to work in grid-connected mode.

Figure 4A:
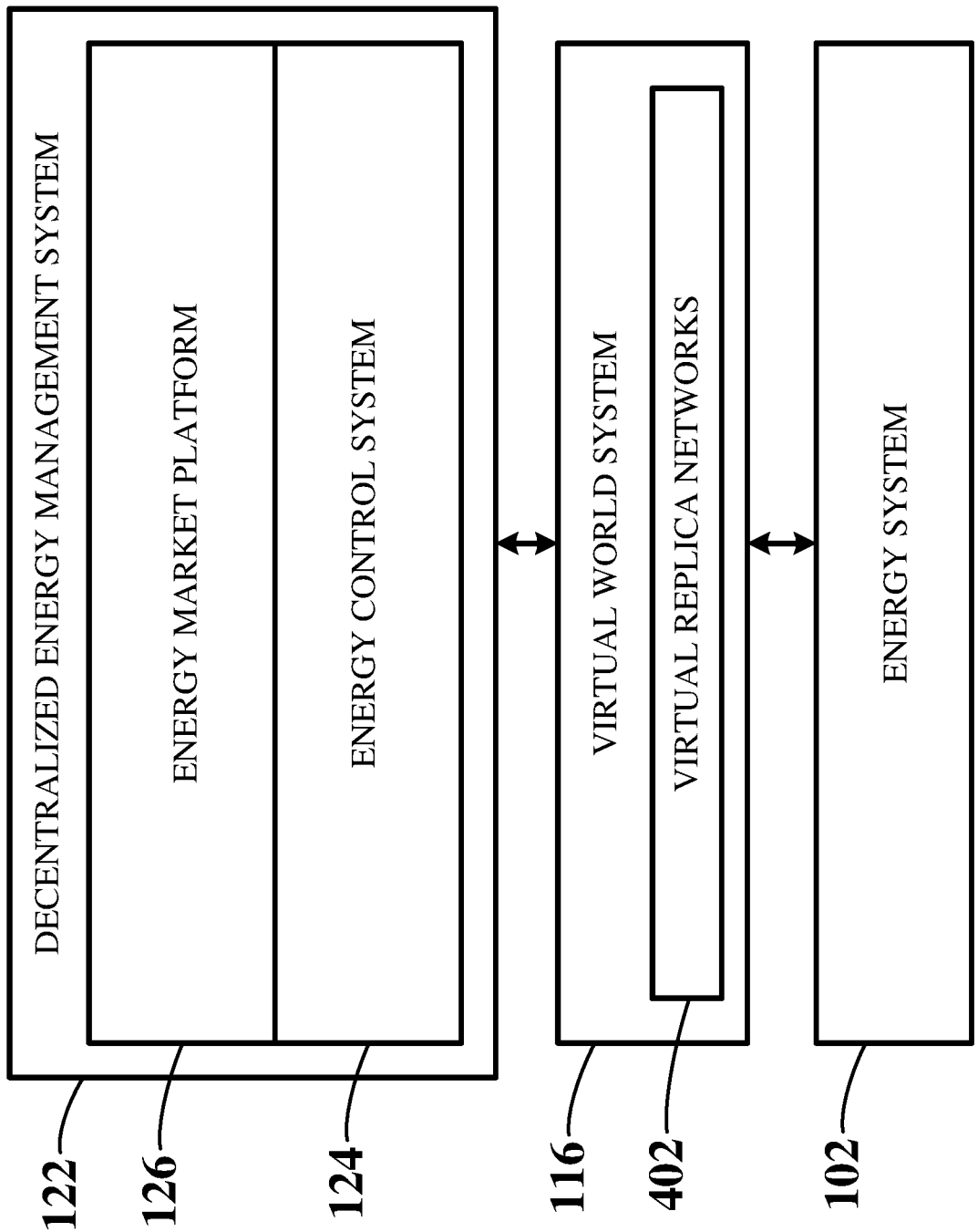
FIG. 4A to FIG. 4B illustrate schematic representations of a decentralized energy management system, according to an embodiment.
Figure 4B:
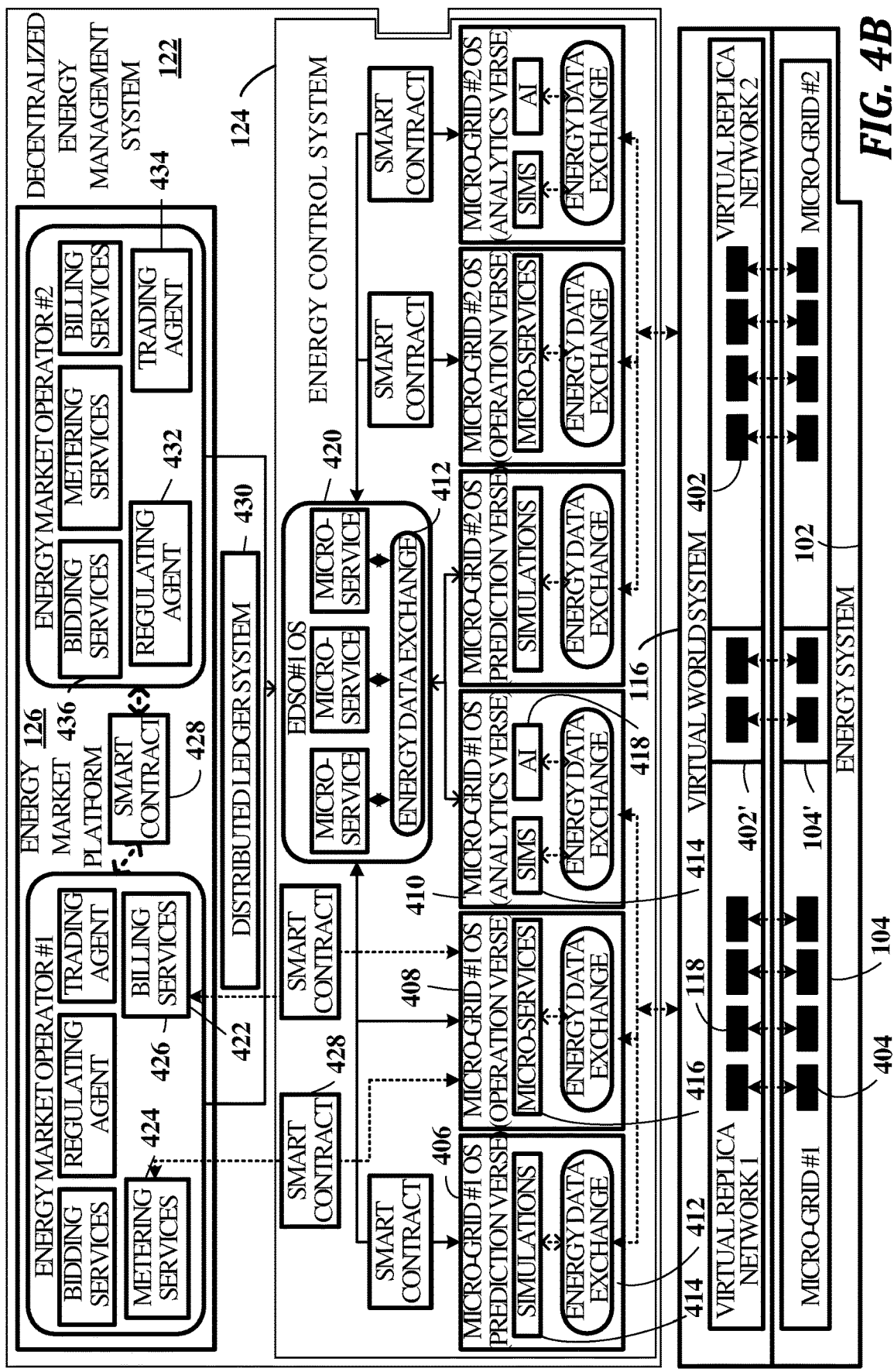

FIG. 4A to FIG. 4B illustrate further schematic representations of an energy supply chain management and optimization system of the current disclosure, according to an embodiment. More specifically, FIG. 4A depicts a schematic representation of an energy supply chain management and optimization system 400a showing the relations between the decentralized energy management system 122, persistent virtual world system 116 and energy system 102, while FIG. 4B shows further details of each of the different systems included within an supply chain management and optimization system, according to an embodiment. Some elements of FIG. 4A to FIG. 4B may refer to similar or the same elements of FIG. 1 to FIG. 3 and thus may use the same reference numbers.

In FIG. 4A, the energy supply chain management and optimization system 400a comprises the energy system 102 which, through a plurality of sensors and smart meters, sends energy data comprising real-time statuses of the energy network to the persistent virtual world system 116. The persistent virtual world system 116 uses the energy data to update virtual replica networks 402 of the persistent virtual world system 116 comprising a plurality of virtual replicas. The energy control system 124 receives the updated energy data from the persistent virtual world system 116 along with energy transaction data from the energy market platform 126, and then proceeds to accordingly assess, control and optimize energy flows. The optimized energy flow information is then sent by the energy control system 124 to the energy market platform 126 to aggregate and exchange energy data between energy actors through corresponding energy-related devices. The energy market platform 126 supports an Energy-as-a-Service (EaaS) economy, providing an open market for trading of energy related data, services, artificial intelligence and simulations, where every prosumer may participate and add value to the whole energy market in a distributed, mobile, intelligent and participatory manner.

FIG. 4B shows an energy supply chain management and optimization system illustrating the systems of the energy supply chain management and optimization system 400a of FIG. 4A in further detail.

Starting at the bottom of FIG. 4B, the energy system 102 comprises a plurality of micro-grids 104, each connecting a plurality of DERs comprising a plurality of energy-related devices 404 that send energy data to corresponding virtual replicas 118 of virtual replica networks 402 from the persistent virtual world system 116. In the example of FIG. 4B, micro-grids 1 and 2 share energy data to the corresponding virtual replica networks 1 and 2, respectively, while some elements of micro-grids 1 and 2 are shared with each other along with the corresponding virtual replica networks 1 and 2, as represented by the micro-grid 104' and virtual replica network 402' comprising said shared elements. For example, an EV traveling from an area covered by micro-grid #1 and currently comprised in the virtual replica network 1 may travel to an area covered by micro-grid #2 comprised in the virtual replica network 2, wherein at a certain point in time (e.g., when crossing from one physical area to another one) the EV may be shared by both micro-grids and virtual replica networks. Updated energy data from the persistent virtual world system 116 is shared with the energy control system 124. The energy control system 124 receives the updated energy data along with transaction data from the energy market platform 126 and implements energy assessment, control and optimization strategies accordingly.

In some embodiments, energy control strategies implemented by the energy control system 124 are based at least partially on solving what is referred herein to as the "energy trilemma", which represents the difficulty of meeting energy supply security while having a minimum amount of carbon emissions and costs. Thus, in these embodiments, energy control strategies implemented by the energy control system 124 are based on at least one of optimizing energy generation and distribution as a factor of lowest energy cost, lowest carbon emissions and security of energy supply.

In some embodiments, the energy control system 124 performs one or more concurrent goal-oriented simulations in corresponding verses, wherein each verse corresponds to individual instances of the virtual world system 116 that can run their own services connected to the corresponding virtual replicas 118. Each verse may be implemented as an individual micro-grid operating system (OS) . . . . The different verses of the energy control system 124 perform one or more supervisory control and data acquisition (SCADA) tasks, such as data acquisition from the energy system 102 through the persistent virtual world system 116, along with prediction, monitoring and control, and analysis of data. Each of the verses of the energy control system 124 utilizes the updated energy data from the persistent virtual world system 116 along with transaction data from the energy market platform 126 as data sets to perform the goal-oriented simulations. In some embodiments, the verses comprise at least a prediction verse 406, an operation verse 408, and an analytics verse 410. Each verse enables an energy data exchange 412 to other verses, providing feedback that may be used as further data sets during the corresponding verse simulations. The prediction verse 406 is configured to forecast energy demand and desired generation in a plurality of scenarios by performing a plurality of simulations 414. Prediction simulations by the prediction verse 406 may comprise, for example, load forecast, constrained forecast, and generation forecast. In other examples, the prediction simulations by the prediction verse 406 may include or take into account weather forecasts, load uncertainty, customer compliance forecasts, customer probability of override forecasts, time of day effects, and day of week effects, amongst others.

The operation verse 408 defines and implements control strategies for preserving the quality and reliability of energy supply, and controls the flows of energy in the energy network. In order to achieve this, the operation verse 408 may connect to a plurality of micro-services 416 from external platforms, or may access local or distributed operation verse services in order to enable corresponding tasks. The operation verse 408 may implement tasks such as virtual power plant (VPP) orchestration; load management; scheduling and dispatch; and generation optimization. Other tasks that may be implemented by the operation verse 408 comprise micro-grid mode control (e.g., grid-connected mode or islanded mode); voltage and frequency control to meet regulations; photovoltaic (PV) smoothing; peak load shifting; load sharing and DER coordination based on energy supply and demand; micro-grid resenchronization with the macro-grid; power flow control between micro-grids and the macro-grid; energy network operation monitoring; fault management; scheduling; network planning; operation planning and optimization; and a variety of other operation tasks. The operation verse 408 can use data from other verses, such as the prediction verse 406 or the analytics verse 410, to optimize the overall performance of the energy system 102. For example, actual and historical data coming from the analytics verse 410 may be fused with high-speed simulation data coming from the prediction verse 406 in the operations verse 408 to prescribe the best generation, storage and trading strategies for the short and long term that can optimize the energy trilemma.

The analytics verse 410 performs augmented and prescriptive analytics through the use of simulations 414 and AI agents 418. Augmented analytics refers to the use of statistical and linguistic technologies to improve data management performance through the use of machine learning. Prescriptive analytics refers to mathematical techniques dedicated to finding the best route or solution for a given situation through the use of optimization, simulation, game theory and decision-analysis methods, which may be used during energy analysis tasks.

In further embodiments, each verse is sub-divided into different object-specific layers facilitating further goal-oriented simulations. For example, electricity and gas networks may be computed as different layers, and may have a separate goal-oriented simulation in each of the separate verses.

In some embodiments, improved state estimations of each virtual replica may be obtained when combining the raw data collected by sensors with cloud-based simulations. For example, actual (e.g. sensory) and simulated data from the plurality of verses may be compared to tune the models in the virtual replicas 120 and optimize operation of their real counter-parts, using machine learning processes running in the cloud servers, where AI-learning processes are reinforced with multi-level simulations. In another example, in a district heating system (DHS), only a few telemetered values of pressure, temperature, and mass flow at the supply or consumer nodes may be available. These values, which may not provide a holistic state of the system, may be augmented and improved in accuracy with simulations running on the one or more verses.

In some embodiments, the persistent virtual world system 116, via the simultaneous goal-oriented simulations in corresponding verses, enables a seamless integration of AI agents configured to automate the energy management and trading processes. Thus, in these embodiments, the various simulation tasks performed by the verses may be executed automatically by the AI agents integrated in the persistent virtual world system 116 through machine learning algorithms.

An example application of energy management automation through the integration of AI agents may be the improvement of security of supply as contingency plans can be evaluated automatically by AI agents using what-if scenarios based on adaptive simulation models and actual network conditions, as performed by the different verses of the energy control system 124. Different situations resulting from the uncertainty of intermittent renewable energy may be automatically evaluated in order to identify a system's weaknesses and bottlenecks. AI agents may propose therefore the best course of action to improve the security of supply in the network, e.g., avoiding blackouts, achieving an optimal scheduling and dispatch.

In another example, asset managers may use collected data and simulations from the various verses to predict under-performance or over-loading of assets leading to equipment failures, and thereby enhance uptime and lifetime of assets whilst minimizing excessive physical repair costs.

In yet another example, actual and historical data can be fused with high-speed simulations to predict near and far future peaks in demand, prescribing the best generation, storage and trading strategies for the short and long term. For example, simulations can be used to accurately predict peaks in electrical consumption in a nearby stadium for the next match, as many thousands of attendees may park their EVs there, all of which may desire simultaneously recharging their batteries during the game.

In yet another example, increased awareness of the present and future conditions of the energy grid can be used by prosumers' AI agents through the various verses of the energy control system 124 to optimize their generation patterns and proactively negotiate with nearby edge nodes through the energy market platform 126 to seek additional storage capacity to respond to future peaks. For example, an AI agent managing a smart home may be aware of a peak demand in electricity in the neighborhood because of an important game in the nearby stadium, which may lead the AI agent to plan the production in advance of more energy from its solar panels, storing the energy in the smart home's own batteries and also renting storage capacity in other houses in the block, so as to sell the energy on the day of a stadium game.

In some embodiments, the various verses are integrated in a unified view that provides a holistic and optimized management of the energy system 104. Therefore, although a user interface (UI) displaying the energy control system 124 may enable filtering and viewing only the desired verses, the energy control system 124 further enables the activation and integration of a view comprising all verses and data resulting from the variety of simulations performed thereby.

In an embodiment, at least one verse from one or more micro-grids connects to one or more EDSO operating systems (OS) 420 in order to maintain distribution and transmission energy networks within operational limits through network reinforcement and load management.

In yet further embodiments, a plurality of energy market operators 422, such as energy market operator #1 and energy market operator #2, connect to individual verses of the energy control system 124 in order to utilize services from the energy control system 124 to aggregate and trade energy flows based on energy data exchange 412, and to share services to the plurality of verses of the energy control system 124. Each energy market operator 422 is an individual, customized instance of the energy market platform 126, enabling a plurality of energy market actors to transact energy. For example, in the illustration of FIG. 4B, the operation verse 408 connects to metering services 424 and billing services 426 from the energy market operator #1. In some embodiments, the energy market operators 422, EDSO OS 420 and the plurality of verses of the energy control system 124 share states and data using smart contracts 428 through a distributed ledger system 430 connected to or configured as part of the decentralized energy management system 122 to manage connections and exchange of information.

Examples of specific energy market actors utilizing the energy market operators 422 are EDNOs, energy transmission owners (ETOs), EDSOs, as well as regulating agents 432 and trading agents 434.

In further embodiments, the plurality of energy market operators 422 request shortfall energy to the one or more EDSO OS 420 when energy demand is higher than energy supplied. In other embodiments, the plurality of energy market operators 422 request, when energy supplied is higher than energy demanded, surplus energy to a peer-to-peer parallel auctioning system utilizing bidding services 436 from the energy market platform 126 in order to trade the extra energy generation to external consumers.

In further embodiments, interactions between prosumers via the energy market platform 126 through the persistent virtual world system 116 may be gamified to incentivize users to optimize energy consumption patterns that may result in an optimization of the energy system. "Gamification" refers herein to the application of game-design elements and game principles in non-game contexts, which may comprise game-like interactions with interactive applications with the goal of optimizing consumption patterns. For example, sustainable consuming patterns in homes, building or factories that reduce carbon emissions or total energy consumption may be rewarded with digital tokens that may be exchanged for optimization services to help to reduce the energy bill. The digital tokens may be viewed in the form of digital or crypto-currencies, discounts, or coupons that provide benefits of interest to prosumers for the optimization of the energy system.

Figure 5:
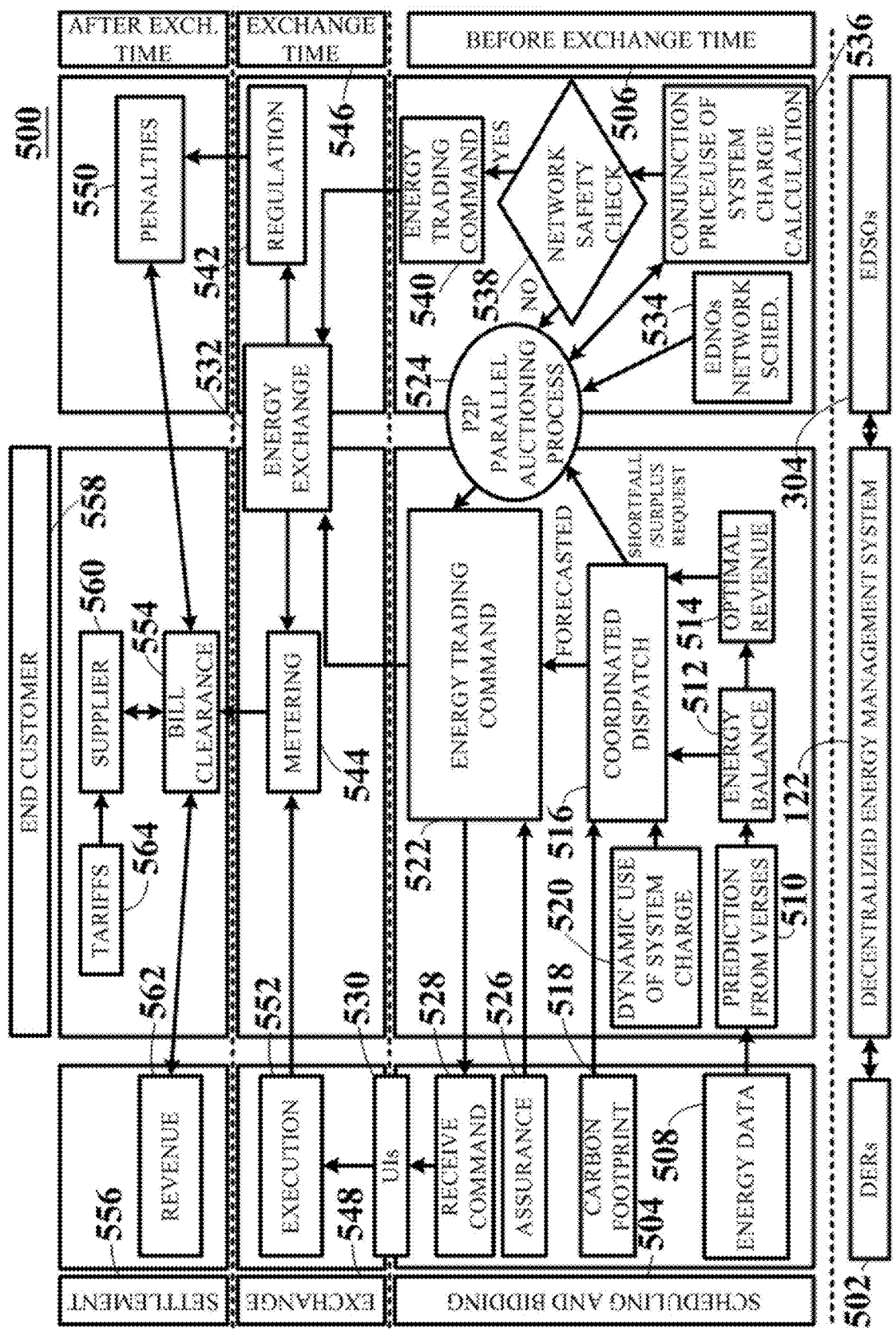
FIG. 5 illustrates an example application of an energy supply chain management and optimization system of the current disclosure, according to an embodiment.

FIG. 5 illustrates an example of energy supply chain management and optimization system application 500 enabling energy trading through an energy market platform (e.g., energy market platform 126 of FIG. 1) in coordination with an energy management system (e.g., energy management system 124 of FIG. 1), according to an embodiment. The application 500 of FIG. 5 coordinates the energy market platform with functions of the energy control system, which for purposes of simplicity are illustrated in FIG. 5 as a sequence of steps comprising a plurality of coordinated tasks in a unified platform. Tasks performed by the application 500 comprise operations from DERs 502 connected to corresponding micro-grids covering one or more specific geographic areas, the decentralized energy management system 122 comprising an energy control system and energy market place, and EDSOs 304 connected to the decentralized energy management system 122. Some elements of FIG. 5 may refer to similar or the same elements of FIG. 1-4B and thus may use the same reference numbers.

Application 500 begins with a scheduling and bidding process layer 504, which may be implemented during a before energy exchange time 506. In general, during the scheduling and bidding process, the decentralized energy management system 122 may implement internal energy coordinating dispatch based on data provided from corresponding DERs 502 for supplying the predetermined one or more geographic areas, and then decide which working mode to adopt for the following time slot (e.g., grid-connected mode or islanded mode). The scheduling and bidding process begins by receiving energy data 508 (e.g., energy availability and/or demand for the particular DERs) by the decentralized energy management system 122 from the energy control system (e.g., energy control system 124 of FIG. 1 and FIG. 4A to FIG. 4B). In some embodiments, the energy data 508 is obtained from a SCADA system implemented in the DERs connected to the micro-grids. In further embodiments, the energy data 508 is first used to update corresponding energy virtual replicas in the persistent virtual world system before being used by the decentralized energy management system 122 for subsequent operations. The energy data 508 is used by the decentralized energy management system 122 to make energy predictions through verses, such as the prediction verse 406 from the energy control system 124 of FIG. 4B. Energy prediction data 510 is used to perform an energy balance, which considers how much energy may need to be produced and consumed to balance the corresponding energy transaction. Energy balance data 512 is then used by the decentralized energy management system 122 to calculate optimal revenue data 514 that may be obtained from the transaction, which may comprise maximizing output profits for corresponding DERs 502. The energy balance data 512 and optimal revenue data 514 are then sent to a coordinated dispatch function 516.

During the scheduling and bidding process, the DERs 502 may further send carbon footprint data 518 to the coordinated dispatch function 516. The carbon footprint data 518 may be calculated by the DER SCADA from the early stage of energy fuel production, transport, and consumption to the final stage of emission, and may be used to calculate carbon emission costs, either directly by the DER SCADA or by the decentralized energy management system 122 through the various verses. The coordinated dispatch function 516 further receives dynamic use of system charge (DUoSC) data 520, which may be used to calculate DUoSC costs that can be added to the coordinated dispatch function 516.

The coordinated dispatch function 516 assesses energy supply and demand from the different market actors (e.g., consumers, suppliers or prosumers) based on their capacity and requirements. The coordinated dispatch function 516 classifies suppliers based on low carbon credentials, price, and dispatchability, and coordinates forecasted desired energy and sends the coordinated forecasted energy to an energy trading command 522 for further deployment. However, if there is a shortfall or surplus of energy within a covered area of the energy network, the coordinated dispatch function 516 sends a separate shortfall/surplus request signal to a peer-to-peer (P2P) parallel auctioning process 524.

When there is enough energy supply to meet the demand of the specific one or more geographic areas covered by a plurality of DERs 502, and after the coordination process by the coordinated dispatch function 516 is completed, the DERs 502 may provide final energy dispatching assurance confirmation 526. With the confirmation 526 from DERs 502, the energy trading command 522 sends energy transaction commands back to the DERs 502. The DERs 502 receive the command 528 for execution via user interfaces (UIs) 530, which enable DER owners to visualize the energy transaction data.

The P2P parallel auctioning process 524 considers and analyzes bidding applications individually sent by the coordinated dispatch function 516, wherein applications are placed in bidding "rounds". In each round, applicants (e.g., buyers and/or sellers) update their bid/sale price based on energy supply and demand. If one of the applications wins a specific deal, applicants update the bidding quantities and/or willingness to continue the bidding process. In some embodiments, results of the bids may involve the selection of most appropriate DERs 502 for delivering the energy. In further embodiments, if a bidder from the specific geographic area wins a bid, the P2P parallel auctioning process 524 signals the energy trading command in order to trigger the energy exchange through an energy exchange service 532.

The energy exchange service 532 trades energy between energy market platforms and any external suppliers through the EDSO 304. In yet further embodiments, when an external energy provider is contributing with energy to the energy market place to provide extra energy needed to meet shortfall energy requirements, the P2P parallel auctioning process 524 may use further information from the external energy provider from the corresponding EDSO 304, such as EDNO network scheduling data 534. After a bid has been successful, the P2P parallel auctioning process 524 may request the corresponding EDSOs 304 data from conjunction price and use of system charge calculation 536 by the corresponding EDNO, and may further request a network safety check 538. If the network safety check 538 is successful, the EDSO 304 may send an energy trading command 540 to the energy exchange service 532. Otherwise, if the network safety check 538 is not successful, the EDSO 304 may send such feedback to the P2P parallel auctioning process 524 for rejecting the current external energy provider supply request and requesting energy to another external energy supplier.

During the conjunction price and use of system charge calculation 536, the EDSO 304 calculates the additional cost to be paid by a current energy market platform for receiving energy from other market platforms taking into account the use of system charge. For example, and making reference to FIG. 3, the current energy market platform may be EMP 1, which may be receiving energy from any of EMPs 2-4. Therefore, the conjunction price calculation may take into account the price to EMP 1 for receiving energy from any of EMPs 2-4. The EDSO 304 may further consider the extent of each transaction's impact on the overall conjunction price, as well as effects on the next bidding round.

The energy exchange service 532 sends a signal to a regulation coordinator 542 of the EDSOs 304 and to a metering service 544 of the decentralized energy management system 122. During energy exchange time 546, in the exchange layer 548 of the application 500, energy system regulators (e.g., policy providers, through a EDSOs, transmission system operators (TSOs), etc.), through the regulation coordinator 542, check and ensure that standards and regulations for the one or more specific geographic areas are met. If policy providers, EDNOs, or TSOs see a breach of obligation, they may send a signal to a penalty service 550.

Further during energy exchange time 546, a signal is sent from the UI 530 to an execution service 552, which sends telemetered data (e.g., megawatts or mega VARs) to the metering service 544. The metering service 544 receives signals from the execution and energy exchange services 552 and 532 through the use of smart meters and sends the measurements for each specific party to a bill clearing service 554.

The last part of the application 500 comprises a settlement layer 556, which is implemented after energy exchange time 546 and which deals with financial aspects of the energy market platform of the decentralized energy management system 122. In the settlement layer 556, penalties may be assigned by EDSOs 304 to DERs 502 and other energy providers who may have missed their commitments for providing energy or for consuming pre-planned energy. Furthermore, the penalty service 550 charges penalties to other market operators if they breach contracts with regulators and other external providers. The penalty service 550 connects to the bill clearing service 554 for clearing penalty bills. Further in the settlement layer 556, after receiving measurements from the metering service 544 and subtracting the penalties associated for those participants who breached regulations and standards, fees are collected from end customers 558 through the bill clearing service 554 via energy suppliers 560. The bill clearing service 554 informs a revenue service 562 of the DERs 502 about any revenues and profit associated to the corresponding DERs 502, and communicates with the one or more energy suppliers 560 to get updates on energy tariffs 564.

End customers 558 may receive different tariffs 564 and charging rates based on the time of consumption of energy (e.g., peak and off-peak tariffs), the type of energy they are consuming, their contribution to balancing the market, and other ancillary services they can provide. Tariffs 564 may be defined within the energy market platform, and may be controlled by energy regulators.

Figure 6:
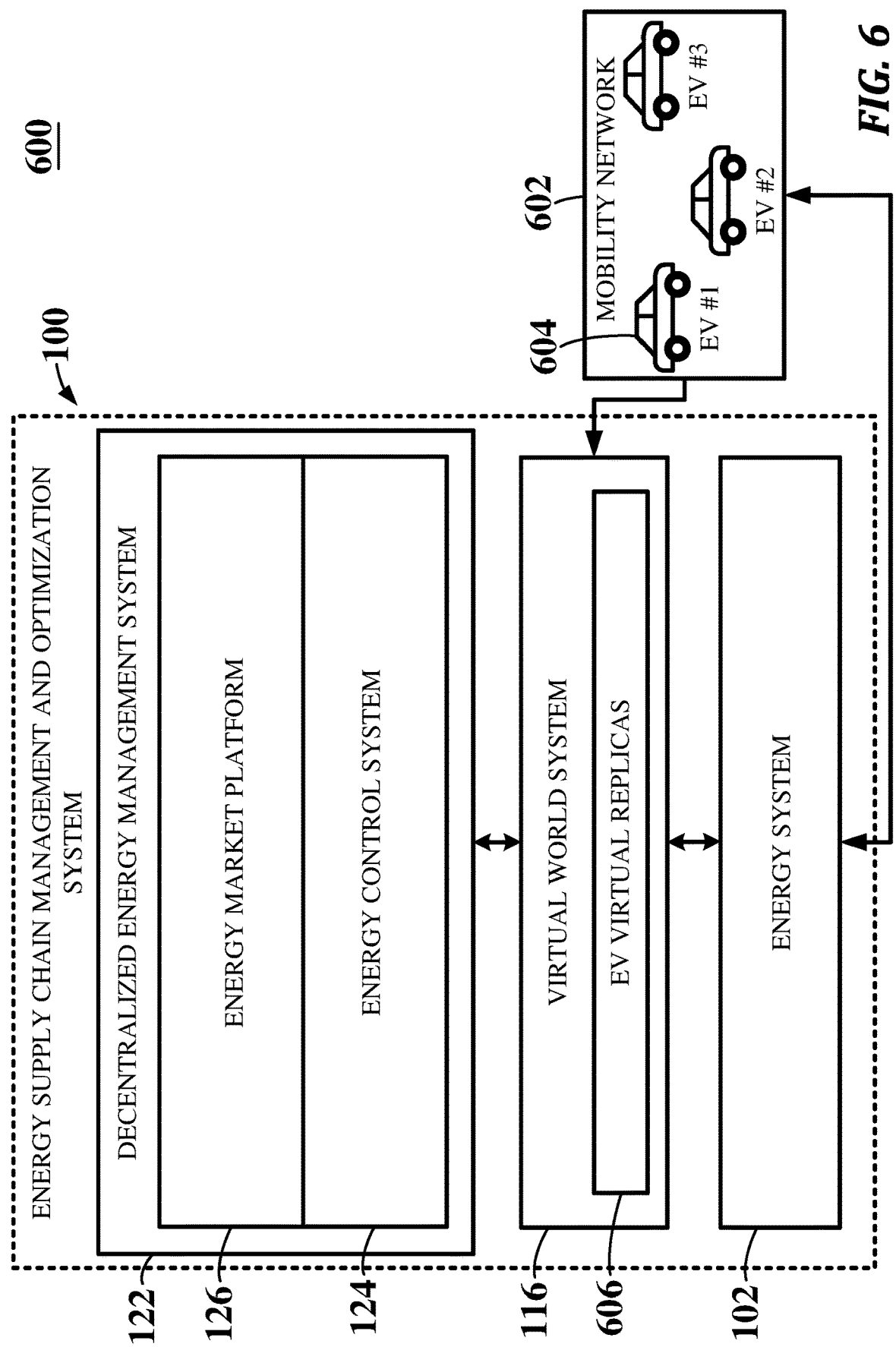
FIG. 6 illustrates a schematic representation of decentralized energy management system connected to a mobility network, according to an embodiment.

FIG. 6 illustrates a schematic representation of an energy and mobility system 600, whereby a decentralized energy management system connects to a mobility network, according to an embodiment. Some elements of FIG. 6 may refer to similar or the same elements of FIG. 1 to FIG. 5 and thus may use the same reference numbers.

In FIG. 6, the energy and mobility system 600 comprises the energy system 102 which, through a plurality of sensors and smart meters, sends energy data comprising real-time statuses of the energy network to the persistent virtual world system 116. A mobility network 602 comprising a plurality of EVs 604 also connects to the energy system 102 and sends energy data to the energy system 102 and mobility data to the persistent virtual world system 116. The mobility network 602 is a network of EVs 604 aggregated in a collaborative platform that may be used by a plurality of users for sharing EVs depending on factors such as availability, distance from the user and EV 604, path of the EV 604, and desired destination or route of the user.

The persistent virtual world system 116 utilizes the energy and mobility data from the mobility network 602 to update the status of the EV virtual replica 606, including but not limited to its energy data and location. In one embodiment, connecting an EV 604 to a charging station, such as a charging station that is part of a micro-grid, updates the energy-trading availability status in the corresponding EV virtual replica 606 of the persistent virtual world system 116. Simultaneously, connecting an EV 604 to a charging station may send a signal to the mobility network 602 to make the status of the connected EV 604 be displayed as unavailable from the mobility network 602 because the EV 604 is not currently available for mobility services, such as for transporting passengers. However, when the EV 604 is disconnected from the corresponding charging station of a micro-grid, the EV 604 may be updated again with an available status in the mobility network 602, making the EV 604 to be displayed available for users that may desire to use mobility services. Thus, in these embodiments, EVs 604 may at any time be visible in both the mobility network 602 and energy system 102 through the persistent virtual world system 116, but, depending on whether the EVs 604 are connected or disconnected to a charging station, the status of the EVs 604 may be updated accordingly.

In some embodiments, tasks such as energy negotiation through the energy market platform 126, energy monitoring through the energy control system 124, or simulations that may be performed in any of the plurality of verses (e.g., prediction verse 406, operation verse 408 or analytics verse 410 of FIG. 4B) may be enabled at all moments (e.g., independently of the EVs 604 being connected or not to a charging station). For example, if an EV 604 is transporting passengers from one area to another one, the energy control system 124 may compute and simulate the required energy for such a trip and may already begin a negotiation process in the energy market platform 126 for subsequently receiving the required energy through a charging station. In some embodiments, said computations and negotiations may be performed automatically by AI agents integrated in the persistent virtual world system 116.

Figure 7:
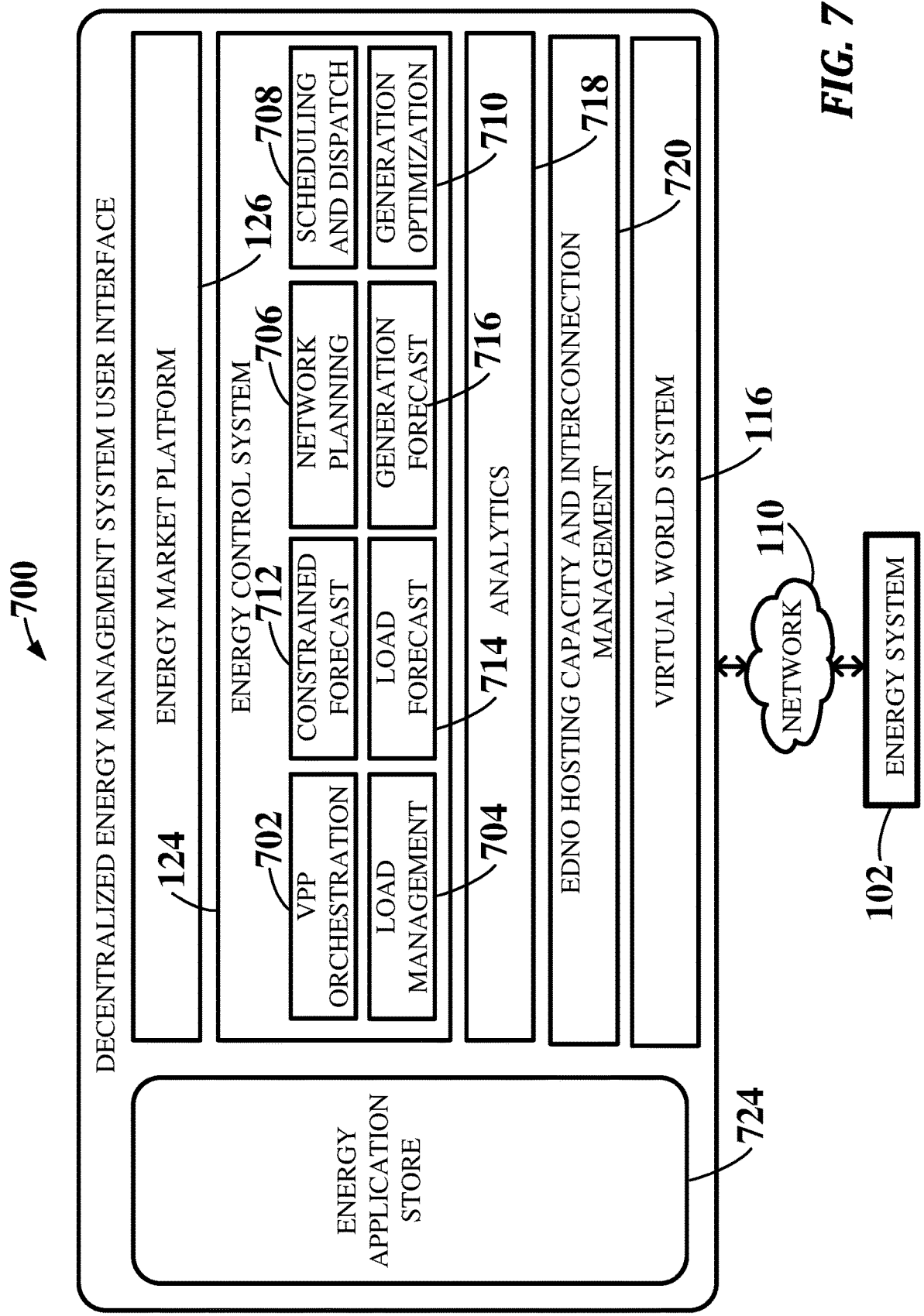
FIG. 7 illustrates a schematic representation of a decentralized energy management system application user interface, according to an embodiment.

FIG. 7 illustrates a schematic representation of a decentralized energy management system application user interface 700 connected through a network 110 to the energy system 102, according to an embodiment. Some elements of FIG. 7 may refer to similar or the same elements of FIG. 1 to FIG. 6 and thus may use the same reference numbers. Furthermore, reference will also be made to elements of FIG. 4B with respect to the plurality of verses therein illustrated.

The decentralized energy management system application user interface 700 refers to a user interface that may be displayed to a user, such as an MGO or any type of prosumer in order to access different services provided through the decentralized energy management system, providing access to a modular and open platform that can connect energy assets and networks with cloud-based services and applications. Such services may comprise, for example, VPP orchestration 702, load management 704, network planning 706, scheduling and dispatch 708, generation optimization 710 (e.g., from the operation verse 406); constrained forecast 712, load forecast 714 and generation forecast 716 (e.g., from the prediction verse 406); analytics 718 (e.g., from the analytics verse 410); EDNO hosting capacity and interconnection management 720, and individual modules enabling access to the persistent virtual world system 116 and energy market platform 126. Furthermore, the decentralized energy management system application user interface 700 may comprise or connect to an energy application store 724, which is an open P2P platform or application library where users may add new content, applications and services to the decentralized energy management system.

The decentralized energy management system application may thus be configured to optimize flows of energy, harnessing advanced artificial intelligence and simulation capabilities. In some example applications, asset owners, network operators and regulators may utilize the decentralized energy management system application 700 to design and evaluate long-term strategic scenarios and potential investments, increasing their economic efficiency. The decentralized energy management system application 700 may further enable an efficient state estimation of the energy system 102 when combining the raw data collected by each of the energy-related devices at the edge with cloud-based simulations from the energy control system 124.

Figure 8A:
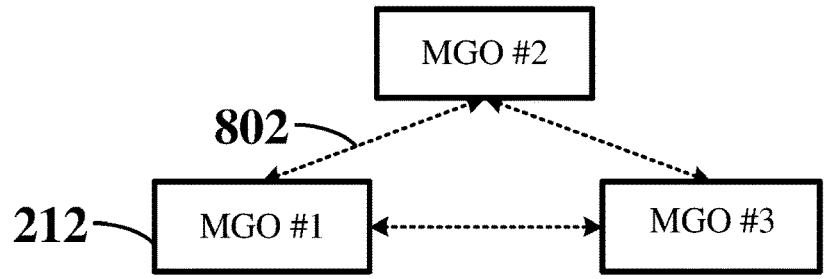
FIG. 8A to FIG. 8C illustrate a network effect of the energy market platform of the current disclosure, according to an embodiment.
Figure 8B:
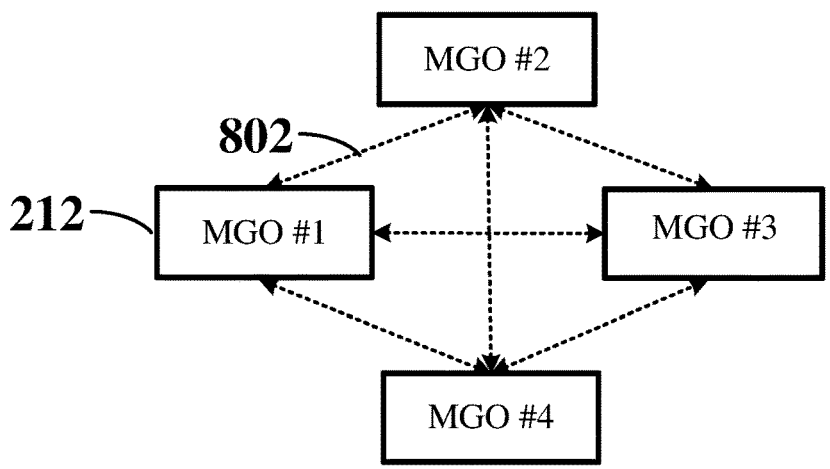
Figure 8C:
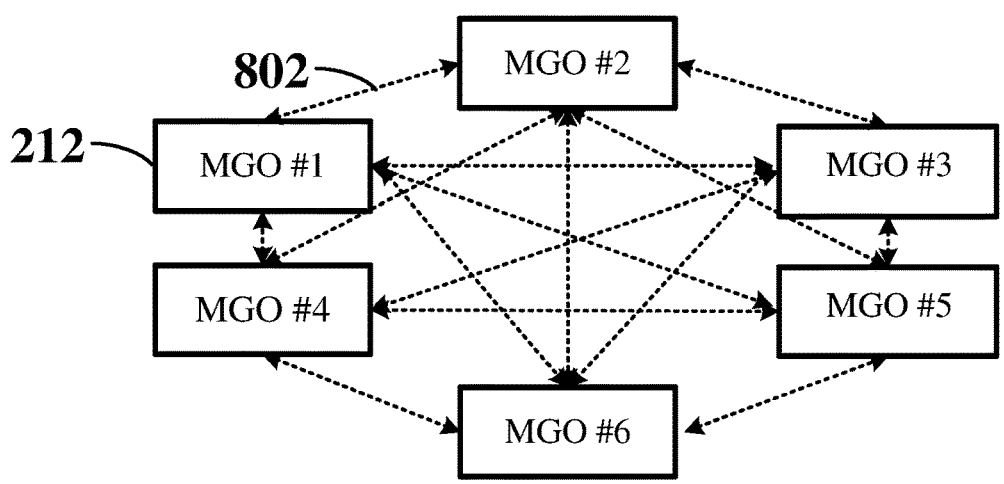

FIG. 8A to FIG. 8C illustrate a network effect 800 of the energy market platform of the current disclosure, according to an embodiment. In FIG. 8A to FIG. 8C, different grids and operators worldwide, represented as the MGOs 212, share not only energy but also data, services and simulations for a global optimization of the energy networks and transactions. As more MGOs 212 join the network, the overall network effect 800 is increased and thus the value that may be provided to the MGOs 212 because of an increase in the services and total energy is available, making the system more attractive for new users to join. The network value may be calculated as:

Network Value="number of links in a fully connected network"×"value per link".

The number of links 802 may be calculated as:
Number of Links=$n(n-1)/2$,
wherein n=number of MGOs 212

In the examples of FIG. 8A to FIG. 8C, the value per link 802 is the overall amount of available energy provided by each MGOs 212 in, for example, kilowatt-hour (kWh), and the Network Value is the total amount of energy provided by network, which may be calculated in kWh. An average of 3000 kWh as the value per link will be used to illustrate the examples.

In FIG. 8A, 3 MGOs 212, MGOs #1-3 are sharing energy, data, services and simulations. With a number of links 802 of $(3\times2)/2=3$, the network value is of $3\times3000$ kWh, or 9000 kWh.

In FIG. 8B, 4 MGOs 212, MGOs #1-4 are sharing energy, data, services and simulations. With a number of links 802 of $(4\times3)/2=6$, the network value is of $6\times3000$ kWh, or 18000 kWh.

In FIG. 8C, 6 MGOs 212, MGOs #1-6 are sharing energy, data, services and simulations. With a number of links 802 of $(6\times5)/2=15$, the network value is of $15\times3000$ kWh, or 45000 kWh.

Figure 9:
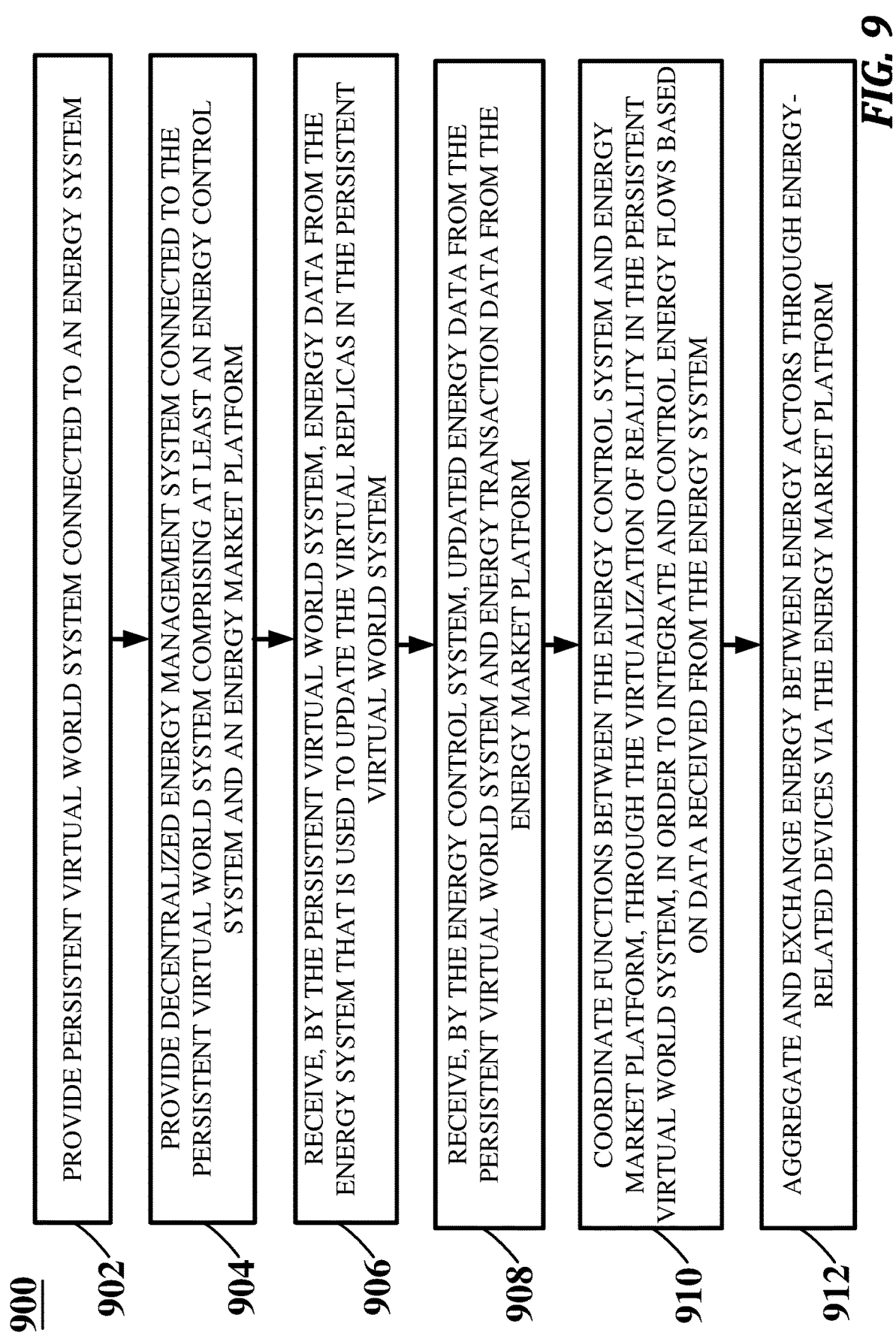
FIG. 9 illustrates a block diagram of an energy supply chain management and optimization method, according to an embodiment.

FIG. 9 illustrates a block diagram of an energy supply chain management and optimization method 900, according to an embodiment.

Method 900 is performed by a system, such as systems 100-800 illustrated, respectively, with reference to FIGS. 1 to 8. In some embodiments, method 900 is implemented by one or more cloud servers (e.g., cloud servers 108 of FIG. 1) connected via a network to an energy system comprising a plurality of inter-connected micro-grids connected to at least one macro-grid. The one or more cloud servers comprise at least one processor and memory storing computer code which, when executed by the at least one processor, performs a plurality of steps illustrated in FIG. 9.

The method 900 begins in step 902 by providing a persistent virtual world system mapped according to the real world and comprising a plurality of virtual objects including at least one virtual replica of a corresponding real-world element. Some of the virtual replicas comprise energy replicas of corresponding energy-related devices from the energy system. In step 904, method 900 continues by providing a decentralized energy management system connected to the persistent virtual world system and comprising at least an energy control system and an energy market platform.

In step 906, the method 900 receives, by the persistent virtual world system, energy data from the energy system that is used to update the virtual replicas in the persistent virtual world system. In step 908, the energy control system receives the updated energy data from the persistent virtual world system along with energy transaction data from the energy market platform, which is then used in step 910 for coordinating functions between the energy control system and energy market platform, through the virtualization of reality in the persistent virtual world system, in order to digitally integrate and control energy flows based on data received from the energy system. In step 912, the method 900 ends by aggregating and exchanging energy between energy actors through energy-related devices via the energy market platform.

FIG. 10 depicts a method 1000 providing further steps that may be performed during the energy flows assessment, control and optimization performed in step 912 of FIG. 9.

Method 1000 may begin in step 1002 by receiving energy data by the decentralized energy management system from the energy control system (e.g., energy control system 124 of FIG. 1 and FIG. 4A to FIG. 4B). In some embodiments, the energy data is obtained from a SCADA system implemented in the DERs connected to the micro-grids. In some embodiments, the energy data is first used to update corresponding energy virtual replicas in the persistent virtual world system. Method 1000 may continue in step 1004 by making energy requirement predictions through verses, such as the prediction verse 406 from the energy control system 124 of FIG. 4B, which may be used in step 1006 to perform an energy balance. In step 1008, the energy balance data is used by the decentralized energy management system to calculate optimal revenues. In step 1010, a calculation of carbon footprint may be performed, which may be calculated by the DER SCADA or by the decentralized energy management system. In step 1012, a calculation of DUOSC and related costs may be performed. Data comprising energy balance, optimal revenues, carbon footprint and DUoSC may be sent to a coordinated dispatch function, as viewed in step 1014.

In step 1016, the method 1000 continues by assessing energy supply and demand, classifying suppliers based on carbon credentials, price, and dispatchability, and coordinating forecasted desired energy. In step 1018, the method 1000 proceeds by checking whether there is any shortfall or surplus energy. If there is no shortfall or surplus energy, the method 1000 sends the coordinated forecasted energy to an energy trading command, as viewed in step 1020. If there is any shortfall or surplus energy, the method 1000 sends a shortfall/surplus request to a P2P parallel auctioning process, as viewed in step 1022. The method proceeds in step 1024 by performing energy exchanges and finishes by performing settlement of energy flow costs to corresponding suppliers, as viewed in step 1026.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The embodiments of the invention in which an exclusive property or privilege is claimed are defined as follows:

1. An energy supply chain management and optimization system, comprising:
   an energy system comprising a plurality of inter-connected micro-grids connected to at least one macro-grid, the energy system communicatively coupled to one or more computing devices through an energy network, the one or more computing devices comprising at least one processor and memory storing computer code which, in response to execution by the at least one processor, causes the one or more computing devices to implement:
   a persistent virtual world system mapped according to a real world and comprising a plurality of virtual objects including at least one virtual replica of a corresponding real world element, wherein some of the virtual replicas comprise energy replicas of corresponding energy-related devices from the energy system; and
   a decentralized energy management system communicatively coupled to the persistent virtual world system and comprising:
      an energy control system configured to, through simulation in the persistent virtual world system, digitally integrate and control energy flows based on data received from the energy system; and
      an energy market platform enabling energy aggregation and exchange between energy-related devices using the persistent virtual world system;
   wherein the energy control system is configured to perform one or more concurrent goal oriented simulations in corresponding verses comprising:
      an operation verse configured to define control strategies for preserving quality and reliability of energy supply and for controlling flows of energy in the energy network;
      a prediction verse configured to forecast energy demand and generation in a plurality of scenarios; and
      an analytics verse configured to perform augmented and prescriptive analytics;
      wherein energy control strategies implemented by the energy control system through the one or more concurrent goal-oriented simulations are based on optimizing energy generation and distribution as a factor of lowest energy cost, lowest carbon emissions and security of energy supply.

2. The energy supply chain management and optimization system of claim 1, wherein the persistent virtual world system, via the concurrent goal-oriented simulations in corresponding verses, enables a seamless integration of artificial intelligence agents configured to automate energy management and trading processes.

3. The energy supply chain management and optimization system of claim 1, wherein the verses are integrated in a unified view that provides holistic and optimized management of the energy system.

4. The energy supply chain management and optimization system of claim 1, wherein each verse is sub-divided into different object-specific streams facilitating further goal-oriented simulations.

5. The energy supply chain management and optimization system of claim 1, wherein the operation verse is communicatively coupled to metering, billing and bidding services of one or more energy market operators.

6. The energy supply chain management and optimization system of claim 1, wherein one or more energy market operators utilize individual instances of the energy market platform in order to aggregate and trade energy flows based on an energy data exchange from the energy control system.

7. The energy supply chain management and optimization system of claim 6, wherein the one or more energy market operators communicate to one or more energy distribution system operators through instances of the energy control system in order to maintain distribution and transmission energy networks within operational limits through network reinforcement and load management.

8. The energy supply chain management and optimization system of claim 7, wherein the one or more energy market operators request shortfall energy to the one or more energy distribution system operators when energy demand is higher than energy supplied, or wherein the one or more energy market operators request, when energy supplied is higher than energy demanded, surplus energy to a peer-to-peer parallel auctioning system of the energy market platform to trade the surplus energy to external consumers.

9. The energy supply chain management and optimization system of claim 1, wherein the energy-related devices of the energy system include one or more of an energy-generating device, an energy storage device, an energy control device, an energy consuming device, and an energy distribution device, and wherein at least some of the energy-related devices are comprised within multi-vector distributed energy resources (DERs).

10. The energy supply chain management and optimization system of claim 9, wherein the DERs comprise one or more of wind turbines, geothermal plants, hydroelectric plants, biomass plants, and electric vehicles (EVs).

11. The energy supply chain management and optimization system of claim 10, wherein the decentralized energy management system enables updating statuses of EV virtual replicas based on whether corresponding EVs are connected or disconnected from a charging station connected to a corresponding micro-grid, wherein connecting an EV to the corresponding micro-grid activates an unavailable status of the EV from a mobility network while enabling the EV for physically trading energy, and wherein disconnecting the EV from the corresponding micro-grid activates an available status of the EV in the mobility network while disabling the EV for physically trading energy.

12. The energy supply chain management and optimization system of claim 1, wherein different instances of the decentralized energy management system share services, states and data using smart contracts to manage connections and exchange of information.

13. The energy supply chain management and optimization system of claim 1, wherein interactions taking place via the energy market platform using the persistent virtual world system are gamified to incentivize users to optimize energy consumption patterns.

14. The energy supply chain management and optimization system of claim 1, wherein the energy market platform further enables exchange and aggregation of data, services and simulations.

15. The energy supply chain management and optimization system of claim 1, wherein the decentralized energy management system comprises or connects to an energy application store for enabling adding new content, applications and services to the decentralized energy management system.

16. An energy supply chain management and optimization method performed by one or more computing devices communicatively coupled via an energy network to an energy system comprising a plurality of inter-connected micro-grids connected to at least one macro-grid, the method comprising:
- providing a persistent virtual world system mapped according to a real world and comprising a plurality of virtual objects including at least one virtual replica of a corresponding real world element, wherein some of the virtual replicas comprise energy replicas of corresponding energy-related devices from the energy system;
- providing a decentralized energy management system communicatively coupled to the persistent virtual world system and comprising at least an energy control system and an energy market platform;
- receiving, by the persistent virtual world system, energy data from the energy system;
- updating, by the persistent virtual world system, the virtual replicas of the persistent virtual world system using the energy data;
- receiving, by the energy control system, updated energy data from the persistent virtual world system and energy transaction data from the energy market platform;
- coordinating functions between the energy control system and the energy market platform, through simulation in the persistent virtual world system, in order to digitally integrate and control energy flows based on data received from the energy system; and
- aggregating and exchanging energy flows between energy actors through energy-related devices via the energy market platform,
- wherein receiving, by the energy control system, the updated energy data from the persistent virtual world system, triggers the energy control system to concurrently perform one or more goal-oriented simulations in corresponding verses comprising at least an operation verse, a prediction verse and an analytics verse,
- the operation verse being configured to perform the steps of:
  - defining control strategies for preserving a quality and a reliability of energy supply; and
  - controlling flows of energy in the energy network based on the control strategies;
- the prediction verse being configured to perform the step of:
  - forecasting energy demand and generation in a plurality of scenarios;
- the analytics verse being configured to perform the step of:
  - performing augmented and prescriptive analytics on received energy data;
- wherein energy control strategies implemented by the energy control system through the one or more goal-oriented simulations are based on optimizing energy generation and distribution as a factor of lowest energy cost, lowest carbon emissions and security of supply.

17. The method of claim 16, wherein the persistent virtual world system, via concurrent goal-oriented simulations in corresponding verses, enables a seamless integration of artificial intelligence agents configured to automate energy management and trading processes.

18. The method of claim 16, wherein the verses are integrated in a unified view that provides a holistic and optimized management of the energy system.

19. The method of claim 16, wherein the energy-related devices of the energy system comprise one or more of an energy-generating device, an energy storage device, an energy control device, an energy consuming device, and an energy distribution device, and wherein at least some of the energy-related devices are comprised within distributed energy resources (DERs).

20. The method of claim 19, wherein the DERs comprise one or more of wind turbines, geothermal plants, hydroelectric plants, biomass plants, and electric vehicles (EVs).

21. The method of claim 19, further comprising:
- in response to receiving a signal indicating a connection of an EV to a corresponding micro-grid through a charging station, activating an unavailable status of the EV from a mobility network while enabling the EV for physically trading energy; and
- in response to receiving a signal indicating a disconnection of the EV from the corresponding micro-grid through the charging station, activating an available status of the EV in the mobility network while disabling the EV for physically trading energy.

22. The method of claim 16, wherein a plurality of energy market operators utilize individual instances of the energy market platform in order to aggregate and trade energy flows based on an energy data exchange from the energy control system.

23. The method of claim 22, further comprising:
- sending, by the plurality of energy market operators to one or more distribution system operators through instances of the energy control system, distribution and transmission energy networks maintenance requests; and
- implementing, by the one or more distribution system operators through said instances of the energy control system, network reinforcement and load management in order to maintain the distribution and transmission energy networks within operational limits.

24. The method of claim 16, further comprising:
- receiving energy data by the decentralized energy management system;
- making energy requirement predictions through the verses via the persistent virtual world system;
- calculating optimal revenues;
- calculating carbon footprint;
- calculating dynamic use of system charge and related costs;
- sending data comprising energy balance, optimal revenues, carbon footprint and dynamic use of system charge and related costs to a coordinated dispatch function;
- assessing energy supply and demand, classifying suppliers based on carbon credentials, price, and dispatchability, and coordinating forecasted desired energy by the coordinated dispatch function;
- checking, by the coordinated dispatch function, whether there is any shortfall or surplus energy;

in response to determining there is no shortfall or surplus energy, sending the coordinated forecasted energy to an energy trading command;

in response to determining there is any shortfall or surplus energy, sending a shortfall/surplus request to a peer-to-peer parallel auctioning process;

performing desired energy exchanges; and performing settlement of energy flow costs to corresponding suppliers.

25. The method of claim 16, further comprising exchanging and aggregating data, services and simulations by the energy market platform.

26. The method of claim 16, further comprising providing an energy application store for enabling adding new content, applications and services to the decentralized energy management system.

* * * * *